(12) United States Patent
Kwon et al.

(10) Patent No.: US 11,736,139 B2
(45) Date of Patent: Aug. 22, 2023

(54) ELECTRONIC DEVICE AND ANTENNA SWITCHING METHOD THEREOF

(71) Applicant: Samsung Electronics Co., Ltd., Gyeonggi-do (KR)

(72) Inventors: Ohhyuck Kwon, Gyeonggi-do (KR); Jaeyoung Huh, Gyeonggi-do (KR); Daesuk Kang, Gyeonggi-do (KR); Boram Kim, Gyeonggi-do (KR); Jonghoon Lim, Gyeonggi-do (KR); Sungchul Park, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 110 days.

(21) Appl. No.: 17/412,890

(22) Filed: Aug. 26, 2021

(65) Prior Publication Data

US 2021/0391889 A1 Dec. 16, 2021

Related U.S. Application Data

(63) Continuation of application No. 16/733,975, filed on Jan. 3, 2020, now Pat. No. 11,108,427.

(30) Foreign Application Priority Data

Jan. 8, 2019 (KR) .................. 10-2019-0002223

(51) Int. Cl.
*H04B 1/44* (2006.01)
*H01Q 3/24* (2006.01)
(Continued)

(52) U.S. Cl.
CPC .............. *H04B 1/44* (2013.01); *H01Q 3/24* (2013.01); *H01Q 21/0025* (2013.01);
(Continued)

(58) Field of Classification Search
CPC ...... H04B 1/44; H04B 1/0064; H04B 17/318; H04B 7/0814; H04B 7/0608;
(Continued)

(56) References Cited

U.S. PATENT DOCUMENTS 9,323,296 B2 * 4/2016 Ngai .................. G06F 1/206
9,385,775 B2 * 7/2016 Ponukumati ........... H04B 1/401
(Continued)

FOREIGN PATENT DOCUMENTS

KR 1020140041939 4/2014
KR 1020150016997 2/2015
(Continued)

OTHER PUBLICATIONS

Korean Office Action dated Nov. 8, 2022 issued in counterpart application No. 10-2019-0002223, 10 pages.
(Continued)

*Primary Examiner* — Lewis G West
(74) *Attorney, Agent, or Firm* — The Farrell Law Firm, P.C.

(57) ABSTRACT

An electronic device and an antenna switching method of an electronic device are provided. A wireless signal is transmitted or received through a first antenna module among a plurality of antenna modules. A temperature of the first antenna module is measured through a first temperature sensor contained in the first antenna module among a plurality of temperature sensors. A second antenna module among the plurality of antenna modules is switched to based on the measured temperature of the first antenna module exceeding a predetermined value. Each temperature sensor is contained in each of the plurality of antenna modules. The wireless signal is transmitted or received through the second antenna module.

18 Claims, 18 Drawing Sheets

(51) Int. Cl.
  *H01Q 21/00* (2006.01)
  *H04B 1/00* (2006.01)
  *H04M 1/02* (2006.01)

(52) U.S. Cl.
  CPC .......... *H04B 1/0064* (2013.01); *H04M 1/026* (2013.01); *H04M 2250/12* (2013.01)

(58) Field of Classification Search
  CPC .. H04B 1/3833; H04B 1/3838; H04B 1/0458; H01Q 3/24; H01Q 21/0025; H04M 1/026; H04M 2250/12; H04W 88/06
  See application file for complete search history.

(56) References Cited

U.S. PATENT DOCUMENTS

| | | | |
|---|---|---|---|
| 9,720,467 B2* | 8/2017 | Jain | G06F 1/206 |
| 10,644,762 B2* | 5/2020 | Seol | H04W 24/10 |
| 2006/0229076 A1* | 10/2006 | Monk | H04W 16/28 |
| | | | 455/442 |
| 2010/0033375 A1* | 2/2010 | Mason | H01Q 3/267 |
| | | | 342/372 |
| 2011/0133982 A1* | 6/2011 | Goshen | G01S 7/4004 |
| | | | 342/174 |
| 2013/0332720 A1 | 12/2013 | Gupta et al. | |
| 2014/0199952 A1* | 7/2014 | Sandhu | H04B 17/13 |
| | | | 455/91 |
| 2014/0206297 A1* | 7/2014 | Schlub | H01Q 1/243 |
| | | | 455/77 |
| 2015/0325911 A1 | 11/2015 | Bard et al. | |
| 2015/0349836 A1* | 12/2015 | Ponukumati | H04B 1/401 |
| | | | 455/553.1 |
| 2016/0204820 A1* | 7/2016 | Mow | H01Q 3/26 |
| | | | 455/575.7 |
| 2016/0308563 A1 | 10/2016 | Ouyang et al. | |
| 2016/0380711 A1* | 12/2016 | Feigin | H04B 1/40 |
| | | | 342/174 |
| 2019/0069304 A1* | 2/2019 | Chang | H04B 17/318 |
| 2019/0342719 A1* | 11/2019 | Zhang | H04W 4/029 |
| 2020/0192442 A1* | 6/2020 | Islam | H04W 52/0209 |

FOREIGN PATENT DOCUMENTS

| | | |
|---|---|---|
| KR | 1020150056197 | 5/2015 |
| KR | 1020150106911 | 9/2015 |

OTHER PUBLICATIONS

International Search Report dated Mar. 24, 2020 issued in counterpart application No. PCT/KR2019/017365, 3 pages.
European Search Report dated May 20, 2020 issued in counterpart application No. 19214771.8-1220, 8 pages.
Indian Examination Report dated Jun. 7, 2023 issued in counterpart application No. 202228034960, 8 pages.

* cited by examiner

ELECTRONIC DEVICE AND ANTENNA SWITCHING METHOD THEREOF

CROSS-REFERENCE TO RELATED APPLICATION(S)

This application is a Continuation Application of U.S. application Ser. No. 16/733,975, filed in the U.S. Patent and Trademark Office (USPTO) on Jan. 3, 2020, which is based on and claims priority under 35 U.S.C. 119(a) to Korean Patent Application No. 10-2019-0002223, filed on Jan. 8, 2019, in the Korean Intellectual Property Office, the disclosures of which are incorporated herein by reference.

BACKGROUND

1. Field

The disclosure relates generally to an electronic device and, more particularly, to an antenna switching method of an electronic device.

2. Description of Related Art

With the growth of wireless communication technology, a great variety of electronic devices (e.g., electronic devices for communication) are widely used. In addition, the use of multimedia contents over a communication network is increasing exponentially, and the network capacity is gradually reaching its limit. After the commercialization of a 4th generation (4G) communication system, a next-generation communication system (e.g., a 5th generation (5G) communication system, a pre-5G communication system, or a new radio (NR) communication system) using a super-high frequency (e.g., millimeter wave (mmWave)) band (e.g., a 3 GHz to 300 GHz band) has been studied in order to satisfy the increasing demands of radio data traffic.

Next-generation wireless communication technologies are currently developed to permit signal transmission/reception using frequencies in the range of 3 GHz to 100 GHz, overcome a high free-space loss due to frequency characteristics, implement an efficient mounting structure for increasing an antenna gain, and realize a related new antenna structure.

For example, when one of a plurality of antenna modules corresponding to a super-high frequency band is used for wireless signal transmission/reception, generated heat may increase at the antenna module that is in use. This may degrade the performance of the antenna module.

SUMMARY

According to an embodiment of the disclosure, an electronic device is provided that includes a wireless communication circuit configured to transmit or receive a wireless signal, a plurality of antenna modules electrically connected to the wireless communication circuit, and a plurality of temperature sensors. Each of the plurality of temperature sensors is contained in each of the plurality of antenna modules. The electronic device also includes a processor electrically connected to the wireless communication circuit, the plurality of antenna modules, and the plurality of temperature sensors. The processor is configured to transmit or receive the wireless signal through a first antenna module among the plurality of antenna modules. The processor is also configured to measure a temperature of the first antenna module through a first temperature sensor contained in the first antenna module among the plurality of temperature sensors. The processor is further configured to switch to a second antenna module among the plurality of antenna modules based on the measured temperature of the first antenna module exceeding a predetermined value. The processor is also configured to transmit or receive the wireless signal through the second antenna module.

According to an embodiment of the disclosure, an antenna switching method of an electronic device is provided. A wireless signal is transmitted or received through a first antenna module among a plurality of antenna modules. A temperature of the first antenna module is measured through a first temperature sensor contained in the first antenna module among a plurality of temperature sensors. A second antenna module among the plurality of antenna modules is switched to based on the measured temperature of the first antenna module exceeding a predetermined value. Each temperature sensor is contained in each of the plurality of antenna modules. The wireless signal is transmitted or received through the second antenna module.

BRIEF DESCRIPTION OF THE DRAWINGS

The above and other aspects, features, and advantages of the disclosure will be more apparent from the following detailed description, when taken in conjunction with the accompanying drawings, in which.

DETAILED DESCRIPTION

Figure 1:
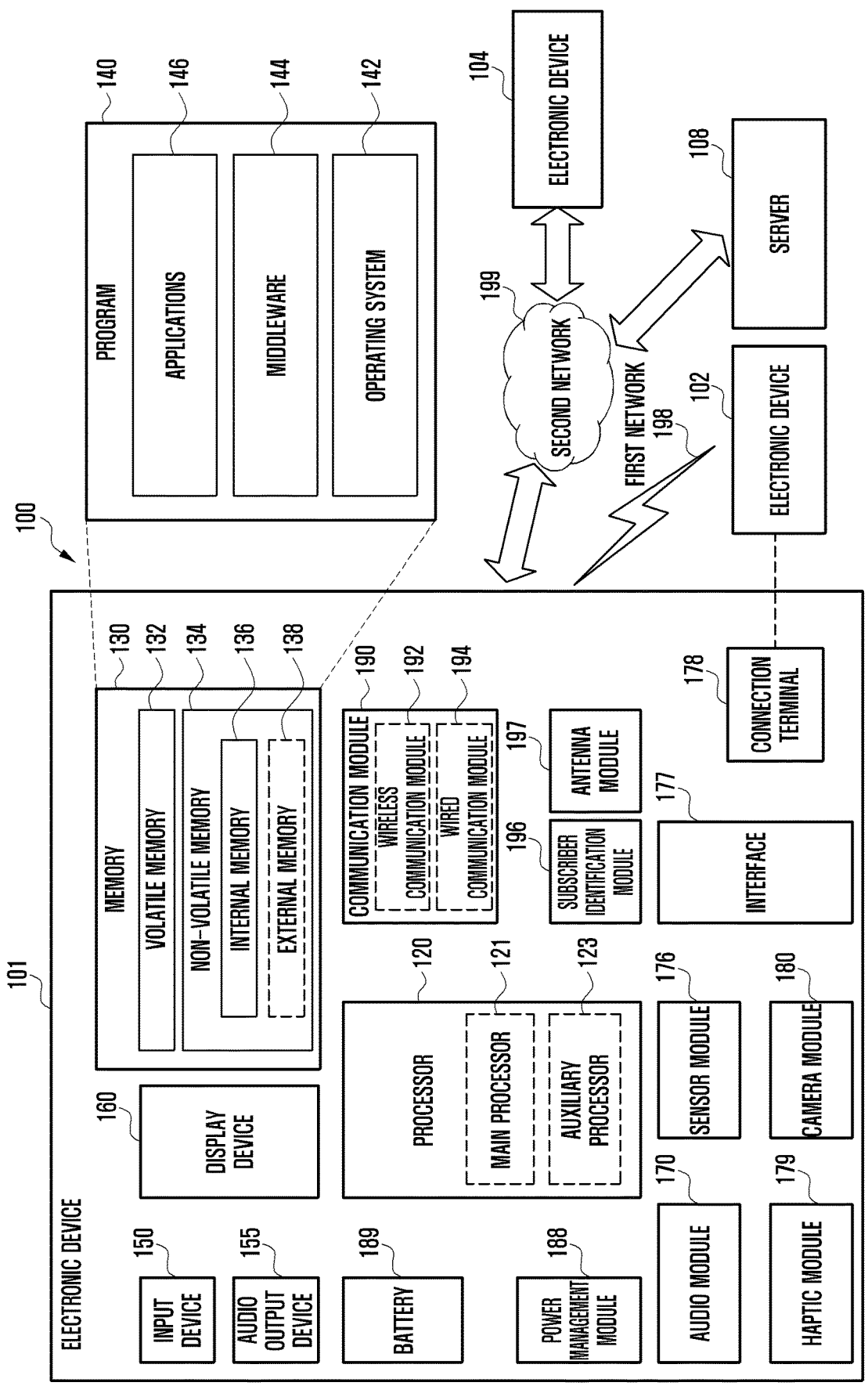
FIG. 1 is a block diagram illustrating an electronic device in a network environment, according to an embodiment.

Embodiments of the disclosure are described in detail below with reference to the accompanying drawings. The same or similar components may be designated by similar reference numerals although they are illustrated in different drawings. Detailed descriptions of constructions or processes known in the art may be omitted to avoid obscuring the subject matter of the disclosure.

FIG. 1 is a block diagram of an electronic device in a network environment, according to an embodiment.

Referring to FIG. 1, an electronic device 101 in a network environment 100 may communicate with a second electronic device 102 via a first network 198 (e.g., a short-range wireless communication network), or a third electronic device 104 or a server 108 via a second network 199 (e.g., a long-range wireless communication network). According to an embodiment, the electronic device 101 may communicate with the third electronic device 104 via the server 108. According to an embodiment, the electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components (e.g., the display device 160 or the camera module 180) may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of the functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as for playing multimedia, and the receiver may be used for incoming calls. According to an embodiment, the receiver may be implemented as separate from, or as part of, the speaker.

The display device 160 may visually provide information to the outside (e.g., a user) of the electronic device 101. The display device 160 may include, for example, a display, a hologram device, or a projector, and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the second electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the second electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the second electronic device 102, the third electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet. or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented by a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
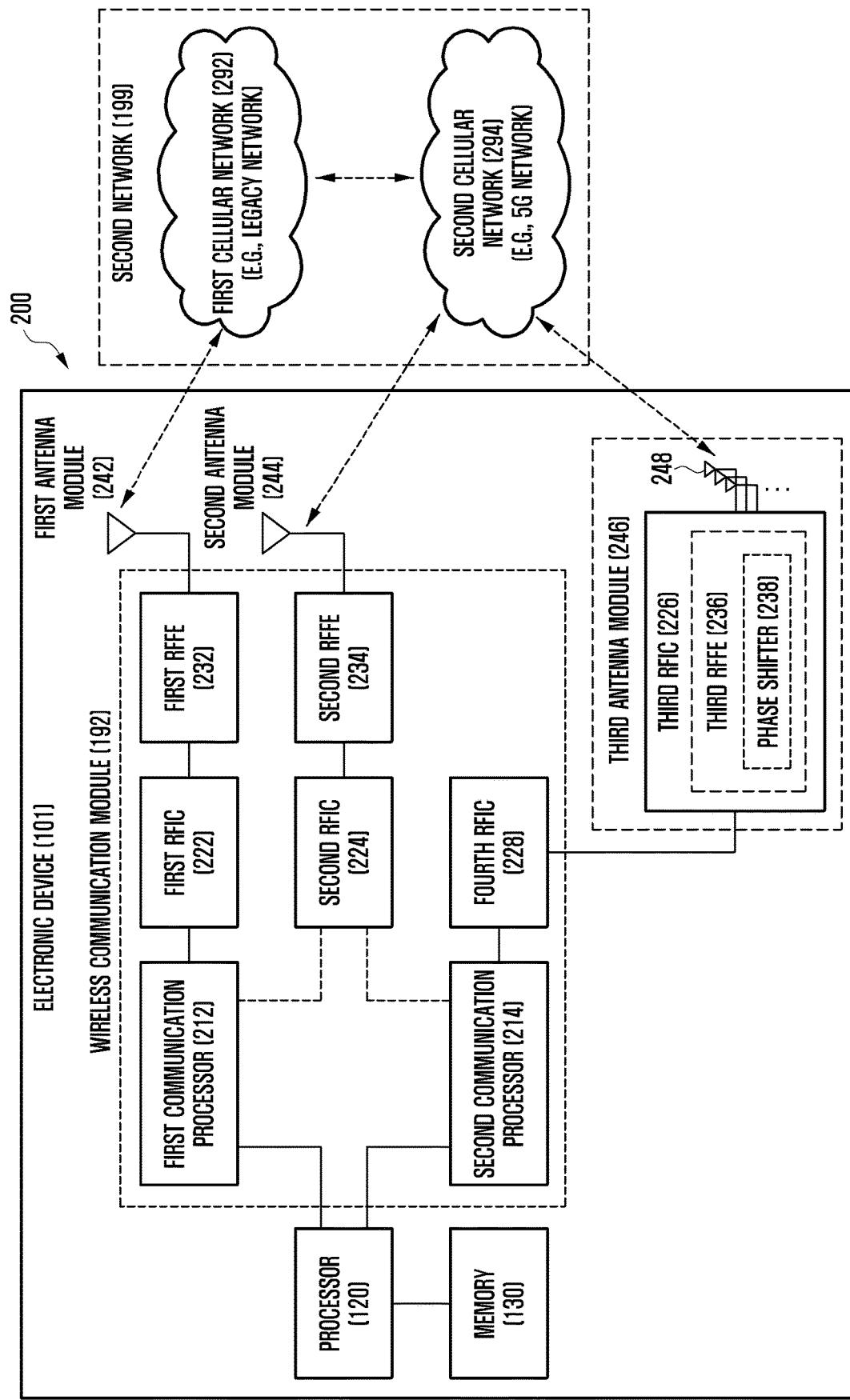
FIG. 2 is a block diagram illustrating an electronic device in a network environment including a plurality of cellular networks, according to an embodiment.

FIG. 2 is a block diagram illustrating an electronic device in a network environment including a plurality of cellular networks, according to an embodiment.

Referring to FIG. 2, the electronic device 101 in a network environment 200 includes a first communication processor (CP) 212, a second CP 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 includes a processor 120 and a memory 130. A second network 199 includes a first cellular network 292 and a second cellular network 294. According to another embodiment, the electronic device 101 may further include at least one of the components described with reference to FIG. 1, and the second network 199 may further include at least one other network. According to an embodiment, the first CP 212, the second CP 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or included as part of the third RFIC 226.

The first CP 212 may establish a communication channel of a band to be used for wireless communication with the first cellular network 292 and support legacy network communication through the established communication channel. The first cellular network may be a legacy network including a second generation (2G), 3G, 4G, or long term evolution (LTE) network. The second CP 214 may establish a communication channel corresponding to a designated band (e.g., about 6 GHz to about 60 GHz) of bands to be used for wireless communication with the second cellular network 294, and support 5G network communication through the established communication channel. The second cellular network 294 may be a 5G network defined in 3GPP. Additionally, the first CP 212 or the second CP 214 may establish a communication channel corresponding to another designated band (e.g., about 6 GHz or less) of bands to be used for wireless communication with the second cellular network 294 and support 5G network communication through the established communication channel. The first CP 212 and the second CP 214 may be implemented in a single chip or a single package. The first CP 212 or the second CP 214 may be formed in a single chip or a single package with the processor 120, the auxiliary processor 123, or the communication module 190.

Upon transmission, the first RFIC 222 may convert a baseband signal generated by the first CP 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first CP 212.

Upon transmission, the second RFIC 224 may convert a baseband signal generated by the first CP 212 or the second CP 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding CP of the first CP 212 or the second CP 214.

The third RFIC 226 may convert a baseband signal generated by the second CP 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second CP 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second CP 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second CP 214.

According to an embodiment, the first RFIC 222 and the second RFIC 224 may be implemented into at least part of a single package or a single chip. The first RFFE 232 and the second RFFE 234 may be implemented into at least part of a single package or a single chip. At least one of the first antenna module 242 or the second antenna module 244 may be omitted or may be combined with another antenna module to process RF signals of a corresponding plurality of bands.

According to an embodiment, the third RFIC 226 and the antenna 248 may be disposed at a same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first CP 212, or the second CP 214).

Figure 3A:
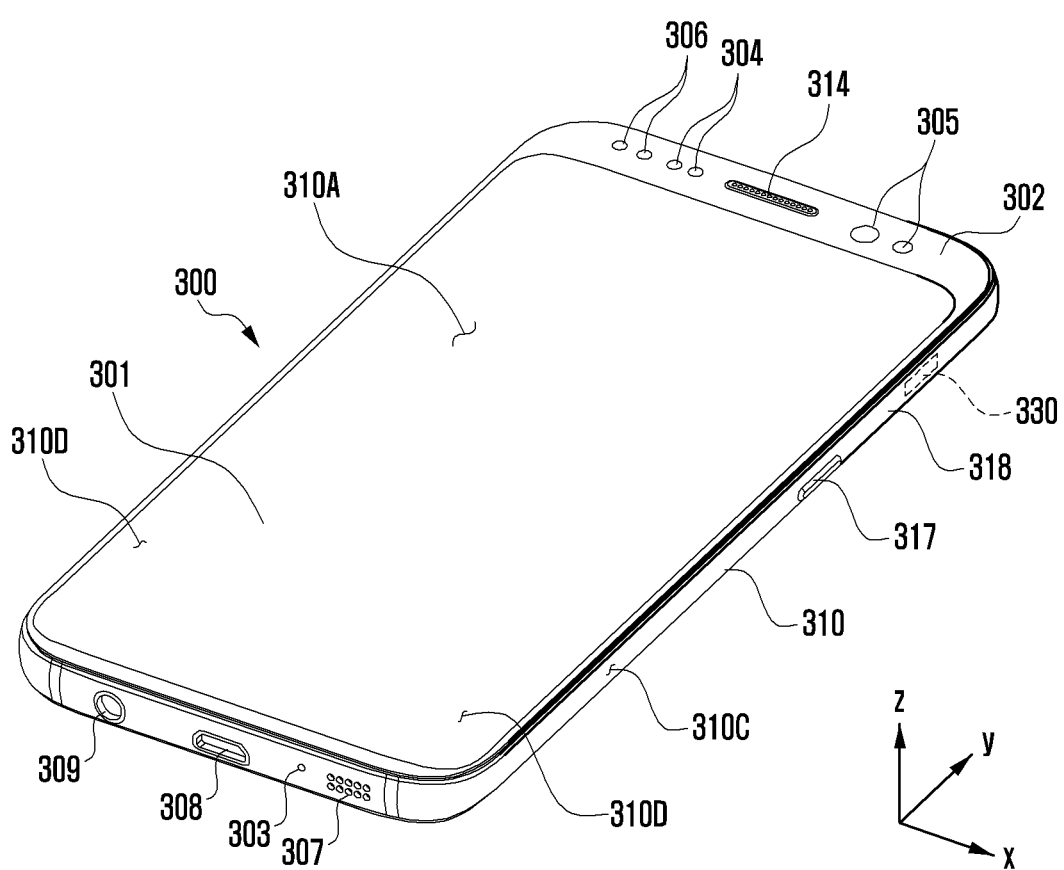
FIG. 3A is a front perspective view illustrating an electronic device, according to an embodiment.

FIG. 3A is a front perspective view illustrating an electronic device, according to an embodiment.

Figure 3B:
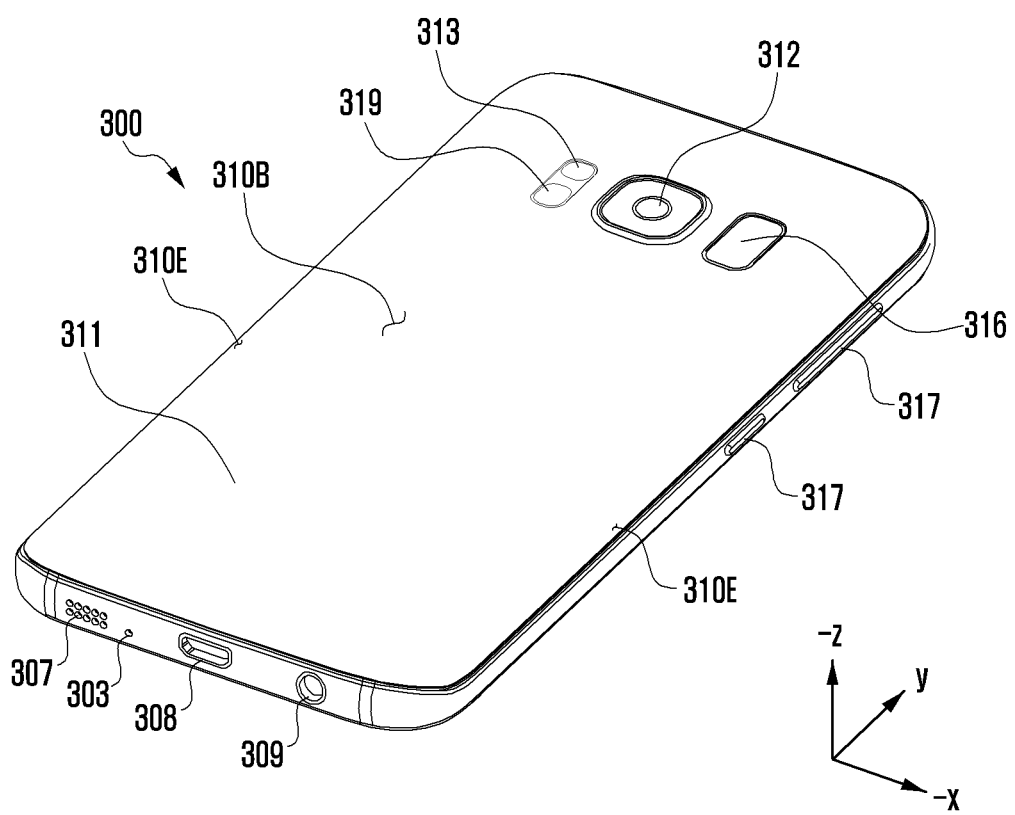
FIG. 3B is a rear perspective view illustrating an electronic device, according to an embodiment.

FIG. 3B is a rear perspective view illustrating an electronic device, according to an embodiment.

Referring to FIGS. 3A and 3B, an electronic device 300 includes a housing 310 having a first surface (or front surface) 310A, a second surface (or rear surface) 310B, and a side surface 310C enclosing a space between the first surface 310A and the second surface 310B. The housing may refer to a structure forming some of the first surface 310A, the second surface 310B, and the side surface 310C. The first surface 310A may be formed by an at least partially substantially transparent front plate 302 (e.g., a polymer plate or a glass plate including various coating layers). The second surface 310B may be formed by a substantially opaque rear plate 311. The rear plate 311 may be formed by, for example, coated or colored glass, ceramic, polymer, metal (e.g., aluminum, stainless steel (STS), or magnesium), or a combination of at least two of the above materials. The side surface 310C may be coupled to the front plate 302 and the rear plate 311 and be formed by a side bezel structure (or side member) 318 including a metal and/or a polymer. The rear plate 311 and the side bezel structure 318 may be integrally formed and include the same material (e.g., metal material such as aluminum).

The front plate 302 includes two first regions 310D bent and extended seamlessly from the first surface 310A toward the rear plate 311 at both ends of a long edge of the front plate 302. As shown in FIG. 3B, the rear plate 311 includes two second regions 310E bent and extended seamlessly from the second surface 310B towards the front plate 302 at both ends of a long edge. The front plate 302 (or the rear plate 311) may include only one of the first regions 310D (or the second regions 310E). A portion of the first regions 310D or the second regions 310E may not be included. When viewed from the side surface of the electronic device 300, the side bezel structure 318 may have a first thickness (or width) at a side surface in which the first region 310D or the second region 310E is not included, and have a second thickness smaller than the first thickness at a side surface including the first region 310D or the second region 310E.

According to one embodiment, the electronic device 300 includes at least one of a display 301, audio modules 303, 307, and 314, sensor modules 304, 316, and 319, camera modules 305, 312, and 313, a key input device 317, a light emitting element 306, and connector holes 308 and 309. The electronic device 300 may omit at least one of the components (e.g., the key input device 317 or the light emitting element 306) or may include additional components.

The display 301 may be exposed through, for example, a substantial portion of the front plate 302. At least part of the display 301 may be exposed through the front plate 302 forming the first region 310D of the side surface 310C and the first surface 310A. An edge of the display 301 may be formed to be substantially the same as an adjacent outer edge shape of the front plate 302. In order to enlarge an area where the display 301 is exposed, a distance between an outer edge of the display 301 and an outer edge of the front plate 302 may be formed to be substantially the same.

In a portion of a screen display area of the display 301, a recess or an opening may be formed, and at least one of the audio module 314 and the sensor module 304, the camera module 305, and the light emitting element 306 aligned with the recess or the opening may be included. At a rear surface of a screen display area of the display 301, at least one of the audio module 314, the sensor module 304, the camera module 305, the fingerprint sensor module 316, and the light emitting element 306 may be included. The display 301 may be coupled to or disposed adjacent to a touch detection circuit, a pressure sensor capable of measuring intensity (pressure) of the touch, and/or a digitizer for detecting a stylus pen of a magnetic field method. At least part of the sensor modules 304 and 319 and/or at least part of the key input device 317 may be disposed in a first region 310D and/or a second region 310E.

The audio modules 303, 307, and 314 include a microphone hole 303 and speaker holes 307 and 314. The microphone hole 303 may include a microphone for obtaining an external sound therein, and, in some embodiments, a plurality of microphones may be included to detect a direction of a sound. The speaker holes 307 and 314 may include an external speaker hole 307 and a call receiver hole 314. The speaker holes 307 and 314 and the microphone hole 303 may be implemented into one hole, or the speaker may be included without the speaker holes 307 and 314 (e.g., a piezo speaker).

The sensor modules 304, 316, and 319 may generate an electrical signal or a data value corresponding to an operating state inside the electronic device 300 or an environment state outside the electronic device 300. The sensor modules 304, 316, and 319 may include, for example, a first sensor module 304 (e.g., proximity sensor) and/or a second sensor module (e.g., fingerprint sensor), disposed at the first surface 310A of the housing 310, and/or a third sensor module 319 (e.g., a heart rate monitor (HRM) sensor) and/or a fourth sensor module 316 (e.g., fingerprint sensor), disposed at the second surface 310B of the housing 310. The fingerprint sensor may be disposed at the second surface 310B as well as the first surface 310A (e.g., the display 301) of the housing 310. The electronic device 300 may further include a sensor module, for example, at least one of a gesture sensor, gyro sensor, air pressure sensor, magnetic sensor, acceleration sensor, grip sensor, color sensor, IR sensor, biometric sensor, temperature sensor, humidity sensor, and an illumination sensor 304.

The camera modules 305, 312, and 313 include a first camera device 305 disposed at the first surface 310A of the electronic device 300, a second camera device 312 disposed at the second surface 310B thereof, and a flash 313. The camera modules 305 and 312 may include one or more of lenses, an image sensor, and an image signal processor. The flash 313 may include, for example, a light emitting diode or a xenon lamp. Two or more lenses (infrared camera, wide angle and telephoto lens) and image sensors may be disposed at one surface of the electronic device 300.

The key input device 317 is disposed at the side surface 310C of the housing 310. The electronic device 300 may not include some or all of the above-described key input devices 317, and the key input device 317 that is not included may be implemented in other forms, such as, for example, as a soft key on the display 301. The key input device 317 may include a sensor module 316 disposed at the second surface 310B of the housing 310.

The light emitting element 306 is disposed at, for example, the first surface 310A of the housing 310. The light emitting element 306 may provide, for example, status information of the electronic device 300 in an optical form. The light emitting element 306 may provide, for example, a light source interworking with an operation of the camera module 305. The light emitting element 306 may include, for example, a light emitting diode (LED), an IR LED, and a xenon lamp.

The connector ports 308 and 309 include a first connector port 308 that may receive a connector (e.g., a USB connector) for transmitting and receiving power and/or data to and from an external electronic device, and a second connector hole (e.g., earphone jack) 309 that can receive a connector for transmitting and receiving audio signals to and from an external electronic device.

Figure 3C:
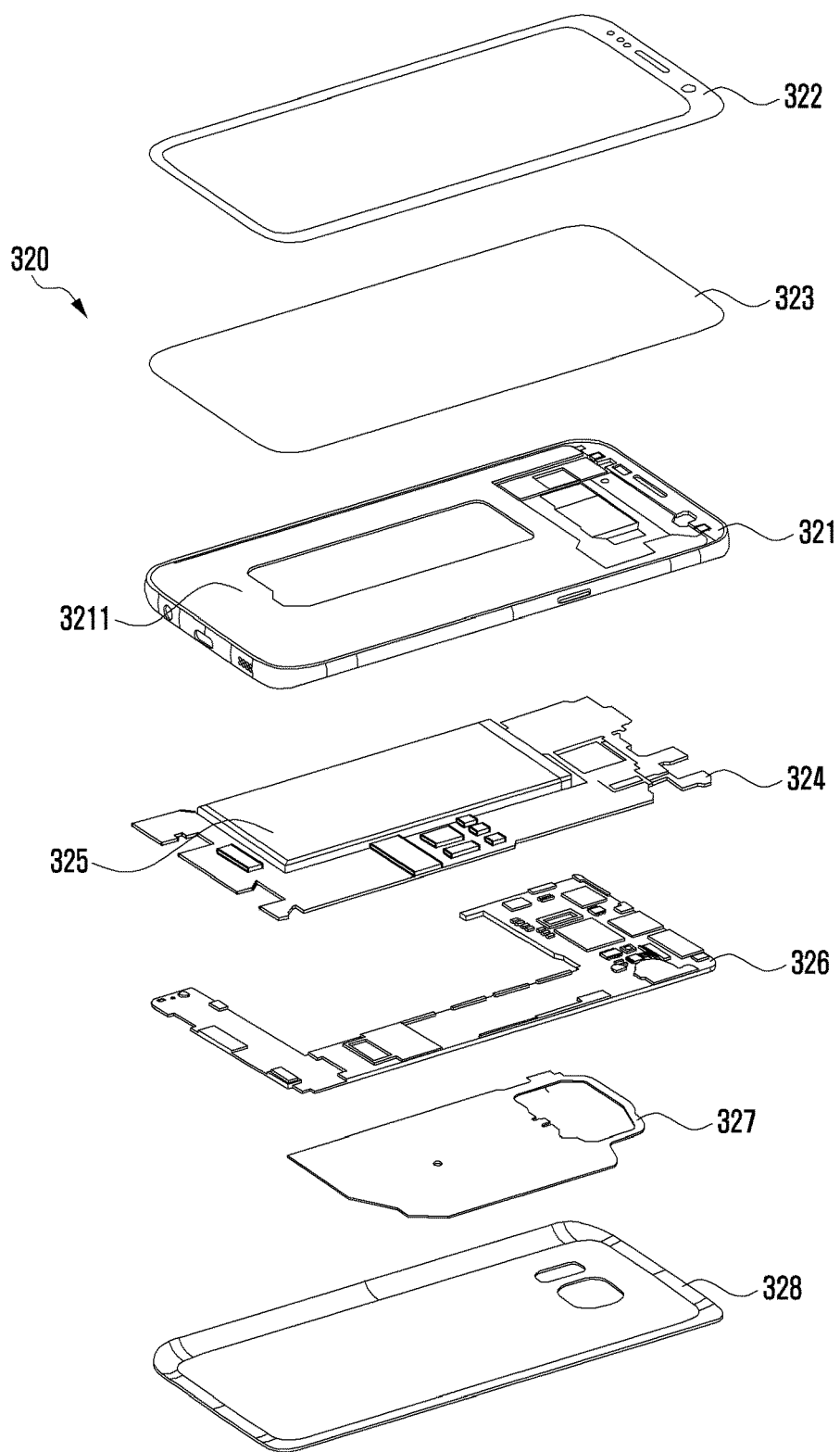
FIG. 3C is an exploded perspective view illustrating an electronic device, according to an embodiment.

FIG. 3C is an exploded perspective view illustrating an electronic device, according to an embodiment.

Referring to FIG. 3C, an electronic device 320 includes a side bezel structure 321, a first support member 3211 (e.g., bracket), a front plate 322, a display 323, a printed circuit board 324, a battery 325, a second support member 326 (e.g., rear case), an antenna 327, and a rear plate 328. The electronic device 320 may omit at least one of the components (e.g., the first support member 3211 or the second support member 326) or may include additional components. At least one of the components of the electronic device 320 may be the same as or similar to at least one of the components of the electronic device 300 of FIG. 3A or 3B, as described in detail above.

The first support member 3211 may be disposed inside the electronic device 320 to be connected to the side bezel structure 321 or may be integrally formed with the side bezel structure 321. The first support member 3211 may be made of, for example, a metal material and/or a non-metal (e.g., polymer) material. In the first support member 3211, the display 323 may be coupled to one surface thereof, and the printed circuit board 324 may be coupled to the other surface thereof. In the printed circuit board 324, a processor, a memory, and/or an interface may be mounted. The processor may include, for example, one or more of a CPU, an AP, a GPU, an ISP, a sensor hub processor, and a CP.

The memory may include, for example, a volatile memory or a nonvolatile memory.

The interface may include, for example, an HDMI, a USB interface, an SD card interface, and/or audio interface. The interface may, for example, electrically or physically connect the electronic device 320 to an external electronic device and include a USB connector, an SD card/multimedia card (MMC) connector, or an audio connector.

The battery 325 is a device for supplying power to at least one component of the electronic device 320 and may include, for example, a non-rechargeable primary battery, a rechargeable secondary battery, or a fuel cell. At least part of the battery 325 may be disposed, for example, on substantially the same plane as that of the printed circuit board 324. The battery 325 may be integrally disposed inside the electronic device 320 or may be detachably disposed in the electronic device 320.

The antenna 327 may be disposed between the rear plate 328 and the battery 325. The antenna 327 may include, for example, a near field communication (NFC) antenna, a wireless charging antenna, and/or a magnetic secure transmission (MST) antenna. The antenna 327 may perform, for example, short range communication with an external device or may wirelessly transmit and receive power required for charging. In one embodiment, an antenna structure may be formed by some or a combination of the side bezel structure 321 and/or the first support member 3211.

Figure 4A:
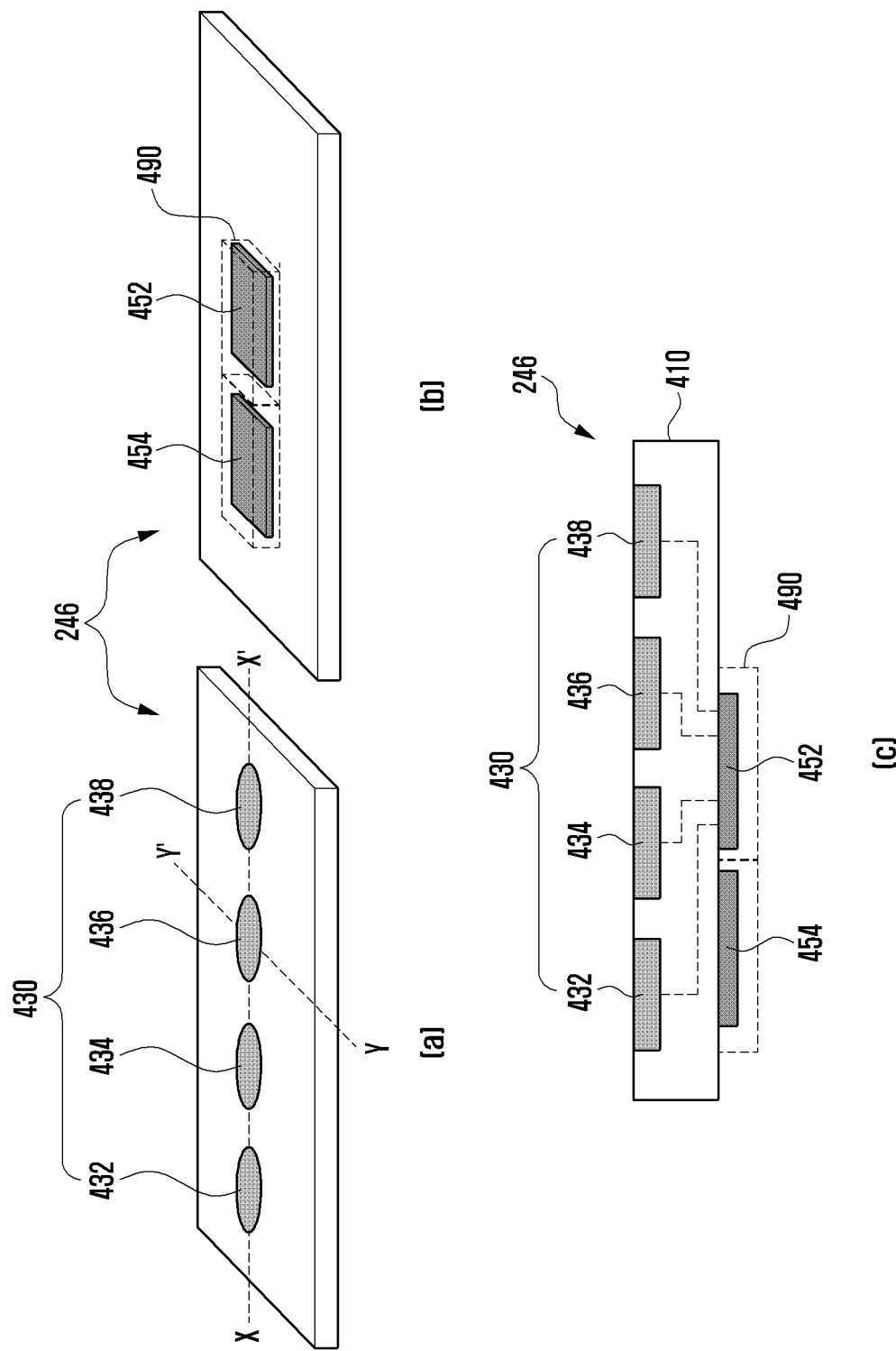
FIG. 4A is a diagram illustrating a structure of a third antenna module described with reference to FIG. 2, according to an embodiment.

FIG. 4A is a diagram illustrating a structure of a third antenna module described with reference to FIG. 2 according to an embodiment.

FIG. 4A(a) is a perspective view illustrating the third antenna module 246 viewed from one side, and FIG. 4A(b) is a perspective view illustrating the third antenna module 246 viewed from the other side. FIG. 4A(c) is a cross-sectional view illustrating the third antenna module 246 taken along line X-X' of FIG. 4A.

With reference to FIG. 4A, in one embodiment, the third antenna module 246 includes a printed circuit board 410, an antenna array 430, a RFIC 452, and a PMIC 454. Alternatively, the third antenna module 246 may further include a shield member 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 includes a plurality of antenna elements 432, 434, 436, or 438 disposed to form a directional beam. As shown in FIG. 4A, the antenna elements 432, 434, 436, or 438 may be formed at a first surface of the printed circuit board 410. According to another embodiment, the antenna array 430 may be formed inside the printed circuit board 410. The antenna array 430 may include the same or a different shape or kind of a plurality of antenna arrays (e.g., dipole antenna array and/or patch antenna array).

The RFIC 452 is disposed at another area (e.g., a second surface opposite to the first surface) of the printed circuit board 410 spaced apart from the antenna array. The RFIC 452 is configured to process signals of a selected frequency band transmitted/received through the antenna array 430. According to an embodiment, upon transmission, the RFIC 452 may convert a baseband signal obtained from a CP to an RF signal of a designated band. Upon reception, the RFIC 452 may convert an RF signal received through the antenna array 430 to a baseband signal and transfer the baseband signal to the CP.

According to another embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 is disposed in another partial area (e.g., the second surface) of the printed circuit board 410 spaced apart from the antenna array 430. The PMIC 454 may receive a voltage from a main PCB to provide power necessary for various components (e.g., the RFIC 452) on the antenna module.

The shielding member 490 is disposed at a portion (e.g., the second surface) of the printed circuit board 410 so as to electromagnetically shield at least one of the RFIC 452 or the PMIC 454. According to an embodiment, the shield member 490 includes a shield can.

In various embodiments, the third antenna module 246 is electrically connected to another printed circuit board (e.g., main circuit board) through a module interface. The module interface may include a connecting member, such as, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
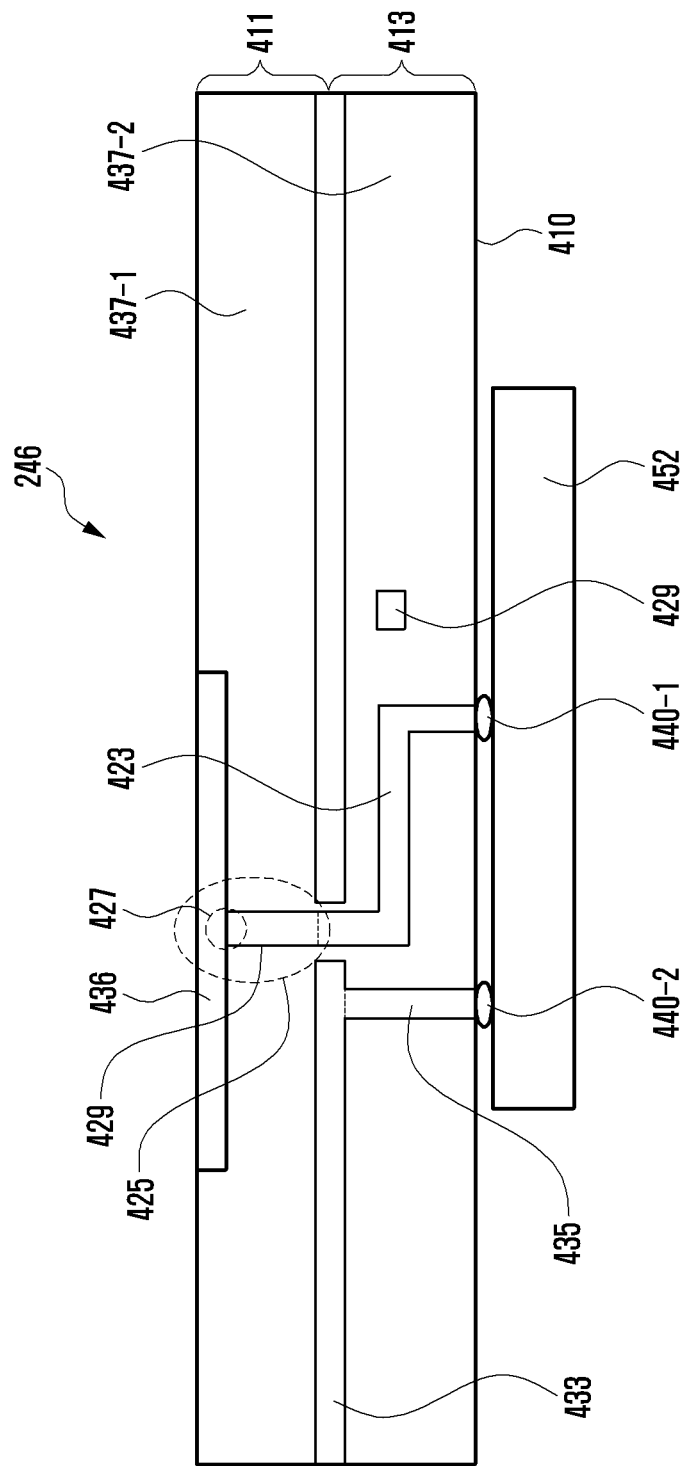
FIG. 4B is a cross-sectional view illustrating the third antenna module taken along line Y-Y' of FIG. 4A(a), according to an embodiment.

FIG. 4B is a cross-sectional view illustrating the third antenna module taken along line Y-Y' of FIG. 4A(a), according to an embodiment. The printed circuit board 410 of the illustrated embodiment includes an antenna layer 411 and a network layer 413.

With reference to FIG. 4B, the antenna layer 411 includes at least one dielectric layer 437-1, and an antenna element 436 and/or a power feeding portion 425 formed on or inside an outer surface of a dielectric layer. The power feeding portion 425 includes a power feeding point 427 and/or a power feeding line 429.

The network layer 413 includes at least one dielectric layer 437-2, at least one ground layer 433, at least one conductive via 435, a transmission line 423, and/or a power feeding line 429 formed on or inside an outer surface of the dielectric layer.

Further, as shown in FIG. 4B, the RFIC 452 of FIG. 4A(c) may be electrically connected to the network layer 413 through, for example, first and second solder bumps 440-1 and 440-2. In other embodiments, various connection structures (e.g., solder or ball grid array (BGA)) may be used instead of the solder bumps. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. The RFIC 452 may also be electrically connected to the above-described module interface through the power feeding line 429.

Figure 5:
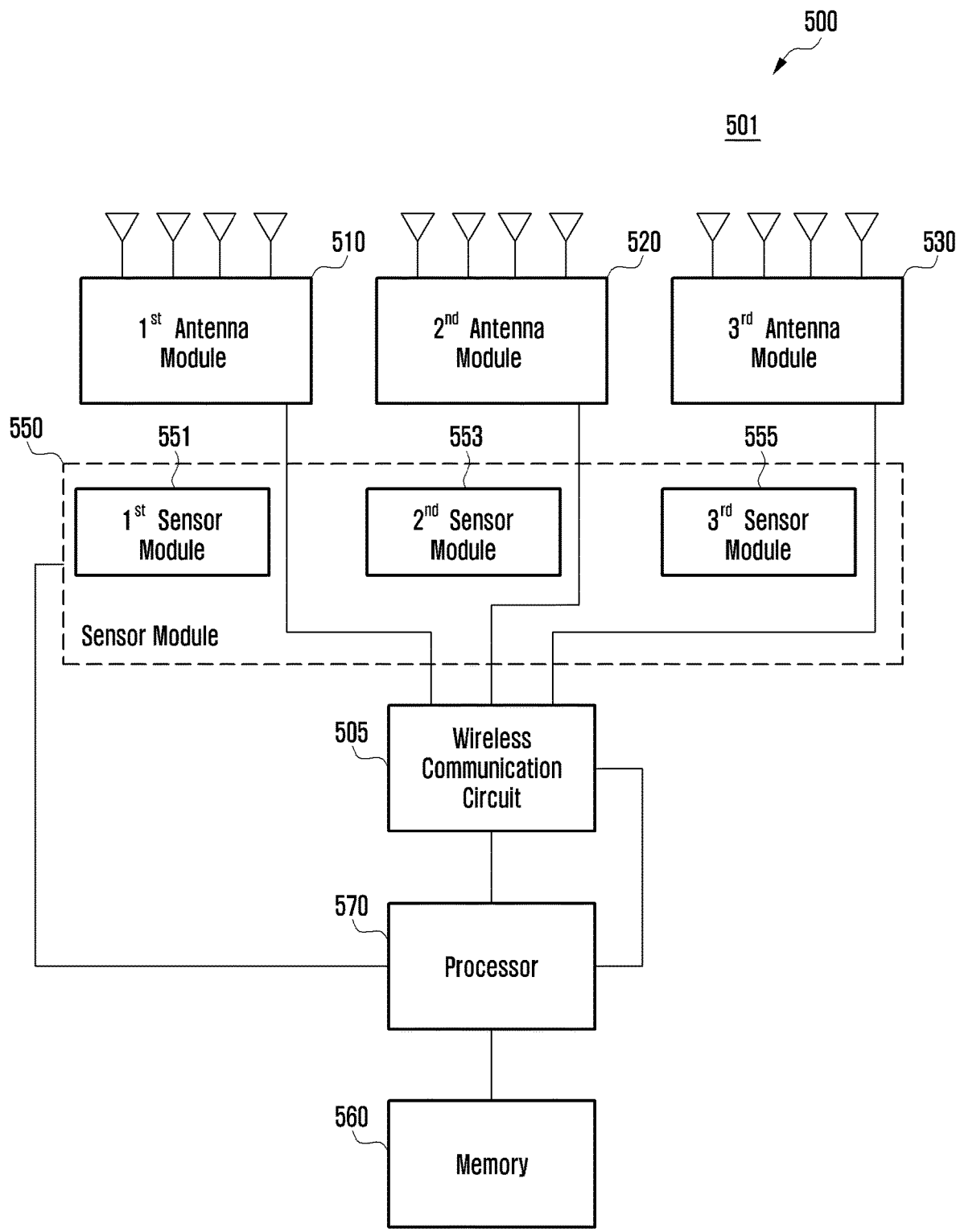
FIG. 5 is a block diagram illustrating an electronic device, according to an embodiment.

FIG. 5 is a block diagram illustrating an electronic device, according to an embodiment.

Referring to FIG. 5, an electronic device 501 shown in a block diagram 500 includes a wireless communication circuit 505, a first antenna module 510, a second antenna module 520, a third antenna module 530, a sensor module 550, a memory 560, and a processor 570. The first antenna module 510, the second antenna module 520, and the third antenna module 530 may be of the same type as the third antenna module 246 in FIG. 2.

In an embodiment, the first antenna module 510 may contain a first sensor module 551. Similarly, the second antenna module 520 may contain a second sensor module 553, and the third antenna module 530 may contain a third sensor module 555. That is, the first to third sensor modules 551, 553, and 555 of the sensor module 550 may be contained in the first to third antenna modules 510, 520, and 530, respectively. In another embodiment, the first to third sensor modules 551, 553, and 555 of the sensor module 550 may be disposed adjacent to the first to third antenna modules 510, 520, and 530, respectively.

In an embodiment, the wireless communication circuit 505 may be configured to transmit and receive a wireless signal of a first frequency band through one of the first antenna module 510, the second antenna module 520, and the third antenna module 530.

The wireless communication circuit 505 may include a switch unit for electrically connecting to or disconnecting from each of the first to third antenna modules 510, 520, and 530. In another embodiment, such a switch unit may not be included in the electronic device 501. Instead, the electronic device 501 may selectively activate ports of the wireless communication circuit 505 respectively connected to the first to third antenna modules 510, 520, and 530 such that the wireless communication circuit 505 is electrically connected to a desired one of the antenna modules (i.e., a switching operation).

The first to third antenna modules 510, 520, and 530 may support the 5G communication using a first frequency band (e.g., 6 GHz or more).

In an embodiment, the sensor module 550 includes the first sensor module 551, the second sensor module 553, and the third sensor module 555. Each of the first to third sensor modules 551, 553, and 555 may be disposed adjacent to or contained in a corresponding one of the first to third antenna modules 510, 520, and 530. For example, the sensor module 550 may include a temperature sensor. Using the temperature sensor, each of the first to third sensor modules 551, 553, and 555 may measure a temperature of a corresponding one of the first to third antenna modules 510, 520, and 530, and transmit the measured temperature to the processor 570.

Although it is described that the electronic device 501 includes the first to third antenna modules 510, 520, and 530 that transmit and receive a wireless signal of a first frequency band, this is not construed as a limitation. The electronic device 501 may further include at least one antenna module for transmitting and receiving a wireless signal of a second frequency band for the LTE or 5G communication. For example, the second frequency band may be 6 GHz or less.

In an embodiment, the memory 560 may store a beam book for beamforming of the first to third antenna modules 510, 520, and 530.

The memory 560 may store predetermined values for determining a specific antenna module to be used for signal transmission/reception, based on qualities of signals (e.g., a reference signal received power (RSRP), a reference signal received quality (RSRQ), or a received signal strength indication (RSSI)) received through the first to third antenna modules 510, 520, and 530.

The memory 560 may also store predetermined values for determining whether a heat generation occurs at the first to third antenna modules 510, 520, and 530, based on a temperature measured by the sensor module 550.

The memory 560 may further store a table about heat generation information of the first to third antenna modules 510, 520, and 530. For example, the table may record a time-specific temperature for each of the antenna modules 510, 520, and 530, a mounting position for each of the antenna modules 510, 520, and 530 in the electronic device 501, a heat generation time for each of the antenna modules 510, 520, and 530, and/or a cooling time for each of the antenna modules 510, 520, and 530. Here, the heat generation time may indicate a time taken to reach a given high temperature due to heat generation. Also, the cooling time may indicate a time taken to reach a given low temperature due to cooling.

In an embodiment, the processor 570 may measure the qualities of signals (e.g., RSRP, RSRQ, or RSSI) received through the antenna modules 510, 520, and 530. In addition, the processor 570 may store the measured signal qualities of the antenna modules 510, 520, and 530 in the memory 560. Also, based on the measured signal qualities, the processor 570 may select a specific one of the antenna modules 510, 520, and 530 to be used for transmitting and receiving a wireless signal. If a temperature of the selected specific antenna module exceeds a predetermined value, the processor 570 may acquire status information about at least one of the other antenna modules among the antenna modules 510, 520, and 530 excepting the specific antenna module. The status information may include at least one of a temperature, RSSI, RSRP, RSRQ, or an array arrangement direction of each antenna module.

Based on the acquired status information, the processor 570 may select, from among the other antenna modules, one antenna module that satisfies a predetermined condition. For example, the predetermined condition may include a case where the temperature is smaller than a predetermined value, a case where the RSSI (or RSRQ, RSRP) exceeds a predetermined value, and/or a case where the array arrangement direction is equal to that of the specific antenna module. Then, the processor 570 may control the selected antenna module to transmit and receive a wireless signal.

When there is no antenna module that satisfies the predetermined condition (e.g., when the signal quality such as RSSI, RSRQ, or RSRP does not exceed the predetermined value and when the temperature is greater than the predetermined value), the processor 570 may output a notification indicating that the wireless communication (e.g., the 5G communication) is not available. In addition, the processor 570 may stop performing the wireless communication (e.g., the 5G communication) using the first frequency band, change the antenna module in use, and perform another wireless communication (e.g., the LTE or 5G communication) using the second frequency band which is different from the first frequency band. For example, the electronic device 501 may send, to a base station, information indicating that communication cannot be continued in the first frequency band, and then the base station may allocate suitable resources for the wireless communication of the second frequency band to the electronic device 501. The second frequency band may be 6 GHz or less.

After changing to the antenna module corresponding to the LTE or 5G communication of the second frequency band, the processor 570 may periodically measure the signal quality (e.g., RSSI, RSRQ, or RSRP) and temperature of the antenna modules 510, 520, and 530 for the 5G communication using the first frequency band. If there is an antenna module satisfying the predetermined condition among the antenna modules, the processor 570 may attempt and perform the wireless communication (e.g., the 5G communication) of the first frequency band by using the antenna module satisfying the predetermined condition while continuously using the antenna module of the second frequency band.

When the measured temperature of one antenna module being currently used for transmitting and receiving a wireless signal exceeds the predetermined value, the processor 570 may store a beamforming angle formed by the currently used antenna module in the memory 560. In addition, the processor 570 may map the beamforming angle stored in the memory 560 to a suitable antenna module for switching. Using the suitable antenna module, the processor 570 may transmit and receive a wireless signal at the mapped beamforming angle.

Figure 6:
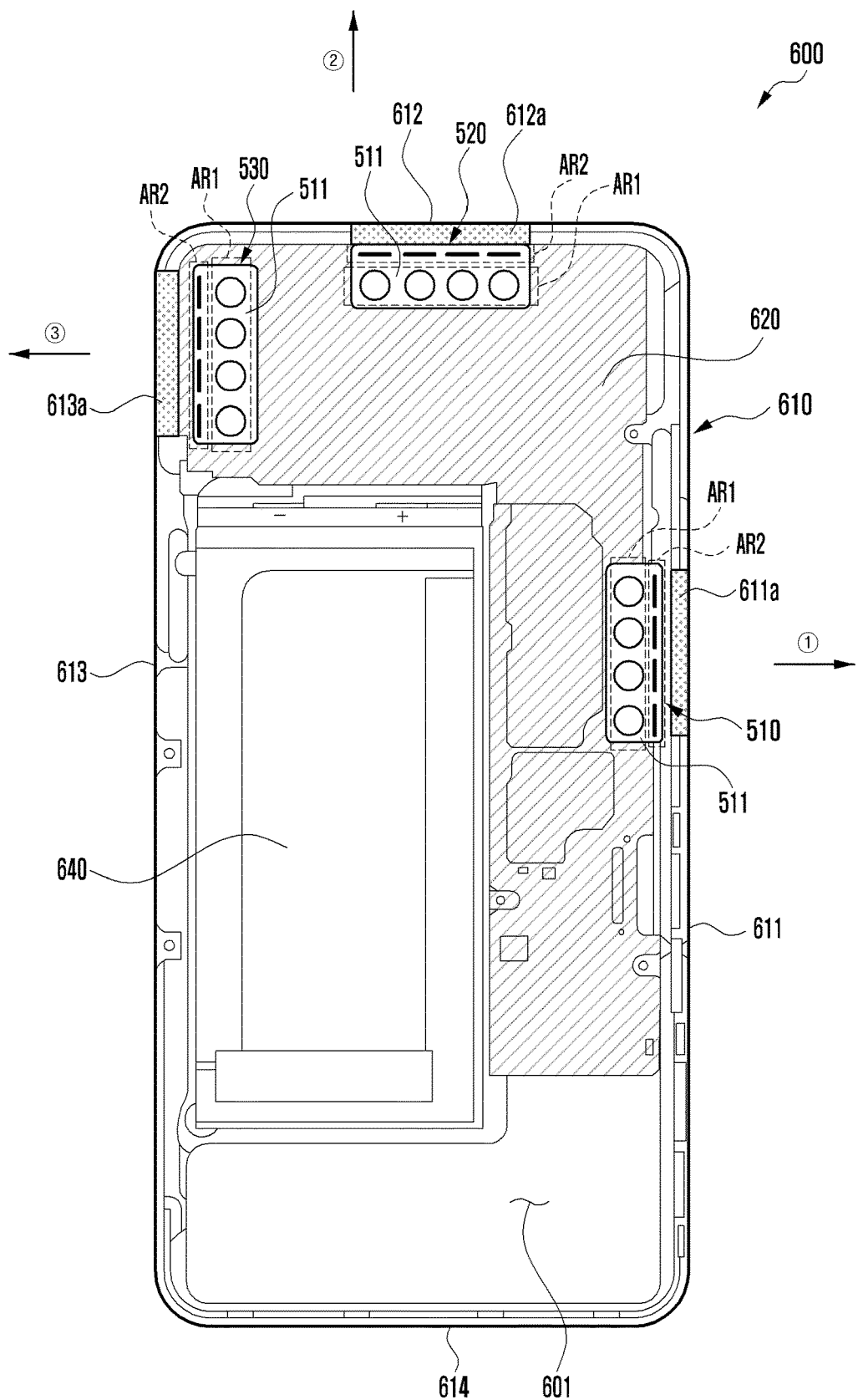
FIG. 6 is a diagram illustrating a configuration of an electronic device including a plurality of antenna modules, according to an embodiment.

FIG. 6 is a diagram illustrating a configuration of an electronic device including a plurality of antenna modules, according to an embodiment.

The electronic device 600 shown in FIG. 6 may be similar, at least in part, to the electronic device 101 in FIG. 1 or the electronic device 300 in FIG. 3A, or may further include another embodiment of the electronic device.

Referring to FIG. 6, the electronic device 600 includes a lateral member 610. The lateral member 610 includes first to fourth lateral surfaces 611 to 614. The first lateral surface 611 has a first length. The second lateral surface 612 runs in a direction perpendicular to the first lateral surface 611 and has a second length smaller than the first length. The third lateral surface 613 runs in a direction parallel with the first lateral surface 611 and has the first length. The fourth lateral surface 614 runs in a direction parallel with the second lateral surface 612 and has the second length. The electronic device 600 includes a battery 640 and a device substrate 620 within an inner space 601 thereof. The device substrate 620 may be disposed to be partially overlapped with or non-overlapped with the battery 640. The electronic device 600 may include the plurality of antenna modules 510, 520, and 530 disposed at various positions within the inner space 601. The antenna modules 510, 520, and 530 may be electrically connected to the device substrate 620. While having the substantially same configuration, all of the antenna modules 510, 520, and 530 may be disposed to form, at least in part, different beam pattern directions within the inner space 601 of the electronic device 600.

The first antenna module 510 includes a PCB 511 and first and second antenna arrays AR1 and AR2 disposed on the PCB 511. The first antenna array AR1 may have a plurality of conductive patches arranged at regular intervals. The first antenna array AR1 may operate as a patch antenna array. The second antenna array AR2 may have a plurality of conductive patterns arranged at regular intervals. The second antenna array AR2 may operate as a dipole antenna array. Each of the second and third antenna modules 520 and 530 may have the substantially same configuration as that of the first antenna module 510.

The first antenna module 510 is disposed near the first lateral surface 611 in the inner space 601 of the electronic device 600. The first antenna array AR1 of the first antenna module 510 may form a beam pattern in a direction (e.g., the −z direction in FIG. 3B) of the rear plate 311 of the electronic device 600, and the second antenna array AR2 may form a beam pattern in a direction (indicated by ①) of the first lateral surface 611 through a first non-conductive region 611a partially formed in the first lateral surface 611.

The second antenna module 520 is disposed near the second lateral surface 612 in the inner space 601 of the electronic device 600. The first antenna array AR1 of the second antenna module 520 may form a beam pattern in a direction (e.g., the −z direction in FIG. 3B) of the rear plate 311 of the electronic device 600, and the second antenna array AR2 may form a beam pattern in a direction (indicated by ②) of the second lateral surface 612 through a second non-conductive region 612a partially formed in the second lateral surface 612.

The third antenna module 530 is disposed near the third lateral surface 613 in the inner space 601 of the electronic device 600. The first antenna array AR1 of the third antenna module 530 may form a beam pattern in a direction (e.g., the −z direction in FIG. 3B) of the rear plate 311 of the electronic device 600, and the second antenna array AR2 may form a beam pattern in a direction (indicated by ③) of the third lateral surface 613 through a third non-conductive region 613a partially formed in the third lateral surface 613.

Figure 7:
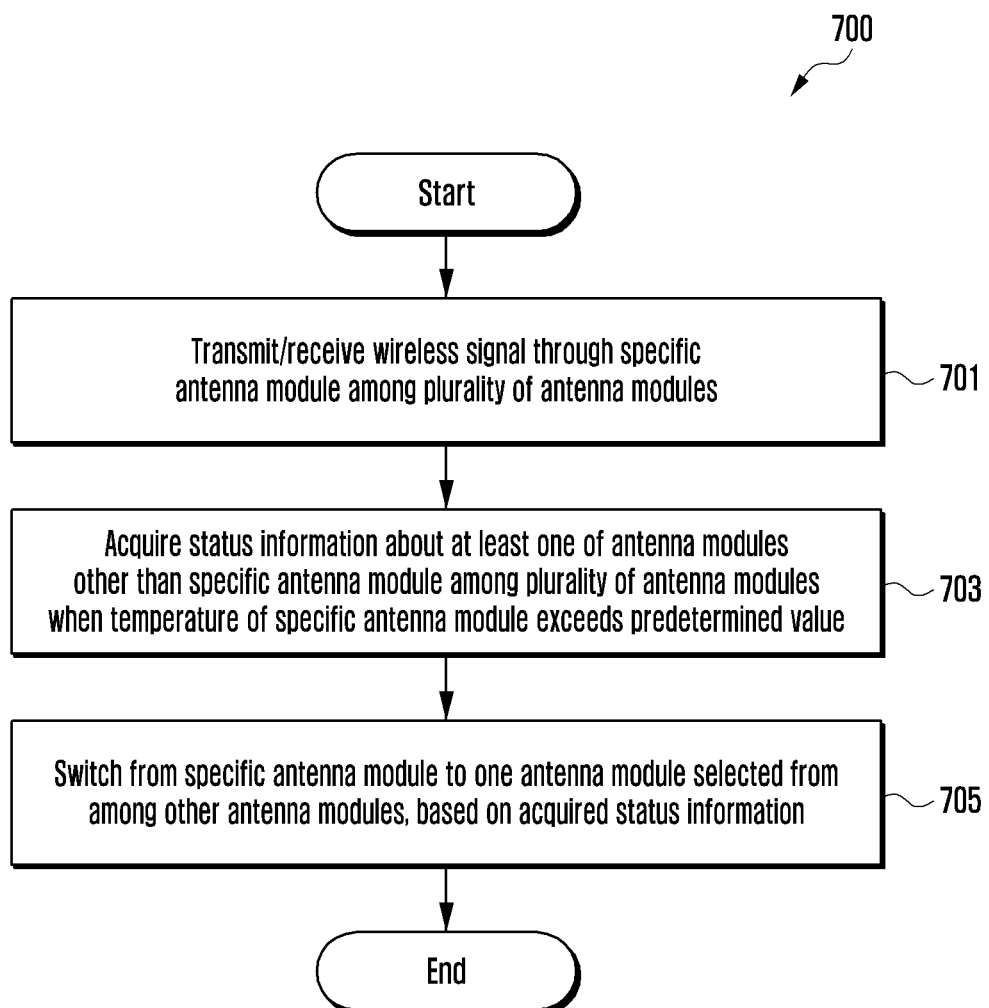
FIG. 7 is a flow diagram illustrating an antenna switching method, according to an embodiment.

FIG. 7 is a flow diagram illustrating an antenna switching method, according to an embodiment.

Referring to FIG. 7, at step 701 of flow diagram 700, a processor transmits and receives a wireless signal through specific antenna module among a plurality of antenna modules. In an embodiment, the plurality of antenna modules may perform a wireless communication by transmitting and receiving a wireless signal of a first frequency band (e.g., 6 GHz or more).

At step 703, the processor acquires status information about at least one of other antenna modules (i.e., antenna modules other than the specific antenna module) among the plurality of antenna modules when a temperature of the specific antenna module exceeds a predetermined value.

The plurality of antenna modules may have sensor modules, respectively. Such sensor modules may be disposed adjacent to or contained in the plurality of antenna modules, respectively. The sensor module may contain a temperature sensor. The processor may acquire a temperature of each of the other antenna modules from the sensor module. e.g., the temperature sensor, which is disposed adjacent to or contained in each of the other antenna modules.

The sensor module. e.g., the temperature sensor, which is disposed adjacent to or contained in the specific antenna module may measure a temperature of the specific antenna module at regular time intervals (i.e., periodically). Then, the processor may acquire the measured temperature from the sensor module.

The status information acquired at the step 703 may include at least one of a temperature of each antenna module, a quality (e.g., RSSI, RSRP, or RSRQ) of a signal received through each antenna module, or an array arrangement direction of each antenna module.

In an embodiment, the processor may continuously perform the above-described step 701 when the temperature of the specific antenna module does not exceed (i.e., is less than or equal to) the predetermined value.

At step 705, the processor may switch from the specific antenna module to an antenna module selected from among the other antenna modules, based on the acquired status information.

Based on the acquired status information, the processor may switch from the specific antenna module to one antenna module that satisfies a predetermined condition. For example, the predetermined condition may include a case where the temperature is smaller than a predetermined value, a case where the RSSI, RSRQ, or RSRP exceeds a predetermined value, and/or a case where the array arrangement direction is equal to that of the specific antenna module.

The processor may transmit and receive a wireless signal by using the antenna module selected through the above switching operation.

In an embodiment, when there is no antenna module that satisfies the predetermined condition (e.g., when the signal quality such as RSSI, RSRQ, or RSRP does not exceed the predetermined value and when the temperature is greater than the predetermined value), the processor may output a notification indicating that the wireless communication (e.g., the 5G communication) using the first frequency band is not available. In addition, the processor may stop performing the wireless communication (e.g., the 5G communication) using the first frequency band, change the antenna module in use, and perform another wireless communication (e.g., the LTE or 5G communication) using the second frequency band which is different from the first frequency band. For example, the electronic device may send, to a base station, information indicating that communication cannot be continued in the first frequency band, and then the base station may allocate suitable resources for the wireless communication of the second frequency band to the electronic device. The second frequency band may be 6 GHz or less.

After changing the wireless communication from the first frequency band to the second frequency band, the processor may periodically measure the signal quality (e.g., RSSI, RSRQ, or RSRP) and temperature of the antenna modules for the 5G communication using the first frequency band. If there is an antenna module satisfying the predetermined condition (e.g., having the signal quality exceeding the predetermined value and also having the temperature less than the predetermined value) among the antenna modules, the processor may attempt and perform the wireless communication (e.g., the 5G communication) of the first frequency band by using the antenna module satisfying the predetermined condition while maintaining the wireless communication using the antenna module of the second frequency band.

Figure 8:
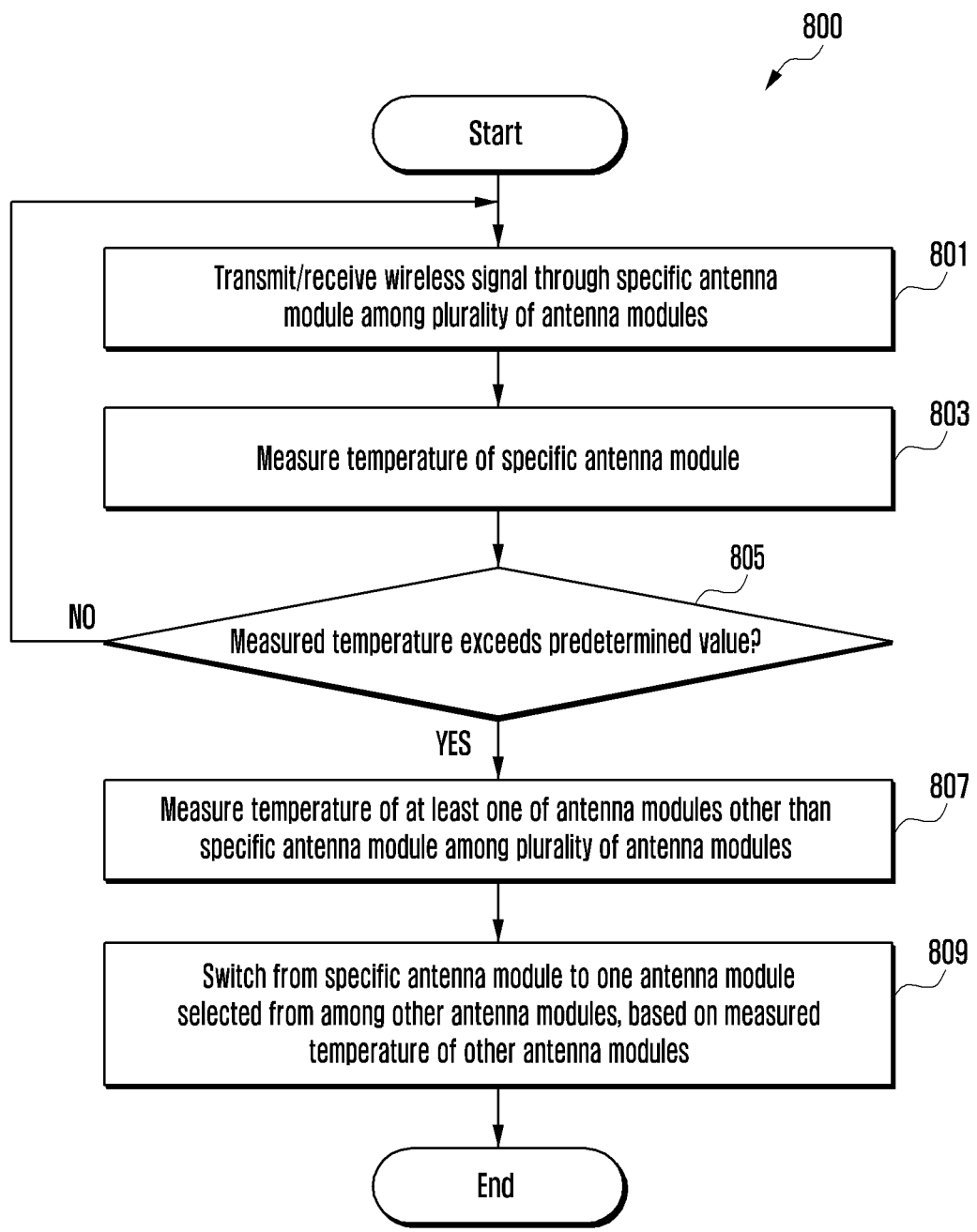
FIG. 8 is a flow diagram illustrating an antenna switching method, according to an embodiment.

FIG. 8 is a flow diagram illustrating an antenna switching method, according to an embodiment.

Referring to FIG. 8, at step 801 of flow diagram 800, a processor transmits and receives a wireless signal through specific antenna module among a plurality of antenna modules.

At step 803, the processor measures a temperature of the specific antenna module. For example, the processor may measure the temperature of the specific antenna module at regular time intervals (i.e., periodically) through a sensor module (e.g., a temperature sensor). The sensor module may be disposed adjacent to or contained in the specific antenna module.

At step 805, the processor determines whether the measured temperature exceeds a predetermined value. If the measured temperature exceeds the predetermined value, the processor measures, at step 807, a temperature of at least one other antenna module (i.e., an antenna module other than the specific antenna module) among the plurality of antenna modules. For example, the processor may acquire the temperature of each of the other antenna modules from a sensor module (e.g., a temperature sensor) disposed adjacent to or contained in each of the other antenna modules.

At step 809, the processor switches from the specific antenna module to one antenna module selected from among the other antenna modules, based on the measured temperature of each of the other antenna modules.

In another embodiment, the processor may perform the above switching operation of antenna modules, based on not only the measured temperature but also a table about heat generation information of each antenna module stored in a memory. The table about heat generation information may record a time-specific temperature for each antenna module, a mounting position for each antenna module in an electronic device, a heat generation time for each antenna module, and/or a cooling time for each antenna module. The heat generation time may indicate a time taken to reach a given high temperature due to heat generation. Also, the cooling time may indicate a time taken to reach a given low temperature due to cooling. Normally, the antenna modules mounted at different positions in the electronic device may have different heat generation times and different cooling times. Therefore, when selecting one antenna module for switching, the processor may select an antenna module having a greater heat generation time and/or having a smaller cooling time on the basis of the table about heat generation information.

In still another embodiment, the processor may perform the above switching operation of antenna modules, based on only the table about heat generation information of each antenna module.

Figure 9:
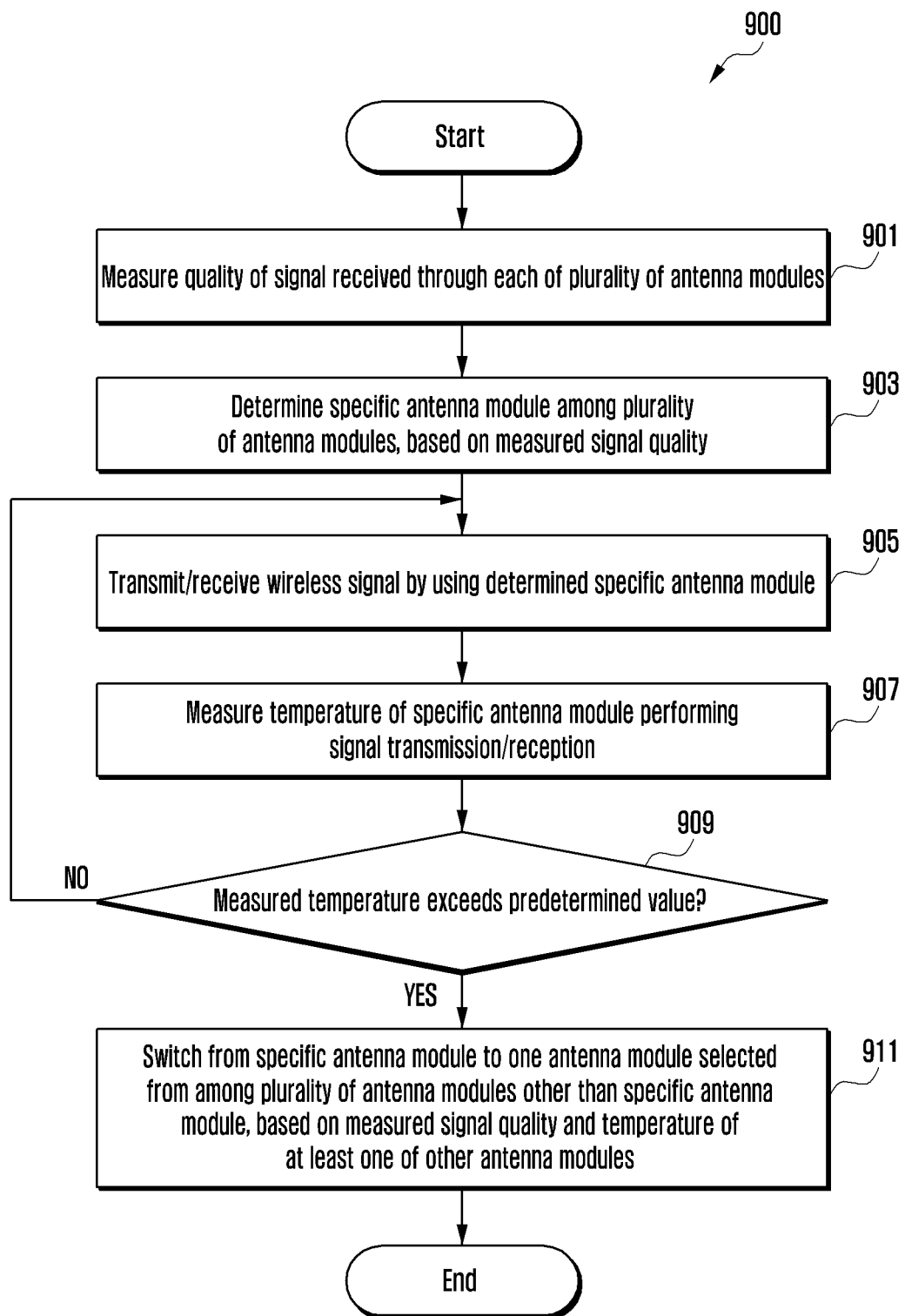
FIG. 9 is a flow diagram illustrating an antenna switching method, according to an embodiment.

FIG. 9 is a flow diagram illustrating an antenna switching method, according to an embodiment.

Referring to FIG. 9, at step 901 of flow diagram 900, a processor measures a quality (e.g., RSSI) of a signal received through each of a plurality of antenna modules. For example, the processor may measure the received signal quality periodically and/or according to each frame in a wireless communication (e.g., the 5G communication). Also, the processor may store the measured signal quality in a memory. The stored signal quality may be used for determining one other antenna module for switching when a temperature of a specific antenna module currently used for transmitting and receiving a wireless signal exceeds a first predetermined value.

At step 903, the processor determines a specific antenna module among the plurality of antenna modules, based on the measured signal quality. For example, the processor may select the specific antenna module having the signal quality (e.g., RSSI) exceeding a second predetermined value. If there are two or more antenna modules having the signal quality exceeding the second predetermined value, the processor may select the specific antenna module having the best quality (e.g., the greatest RSSI).

At step 905, the processor transmits and receives a wireless signal by using the determined specific antenna module.

The processor measures, at step 907, a temperature of the specific antenna module performing signal transmission/reception and then determines, at step 909, whether the measured temperature exceeds the first predetermined value.

Steps 907 and 909 are the same as steps 803 and 805 in FIG. 8, which are described in detail above.

When the measured temperature exceeds the first predetermined value, the processor switches, at step 911, from the specific antenna module to one antenna module selected from among the plurality of antenna modules other than the specific antenna module, based on the measured signal quality (e.g., RSSI) and temperature of at least one of the other antenna modules.

In an embodiment, the processor may determine whether the signal quality (e.g., RSSI) of each of the other antenna modules measured at the step 901 exceeds the second predetermined value, and/or determine whether the temperature of each of the other antenna modules measured through the sensor module exceeds the first predetermined value. Then, in order to perform the switching operation, the processor may select, for example, one antenna module having the signal quality exceeding the second predetermined value and also having the temperature not exceeding the first predetermined value from among the other antenna modules.

In another embodiment, the processor may perform the switching operation based on not only the signal quality and the temperature but also a table about heat generation information of each antenna module stored in the memory.

Figure 10:
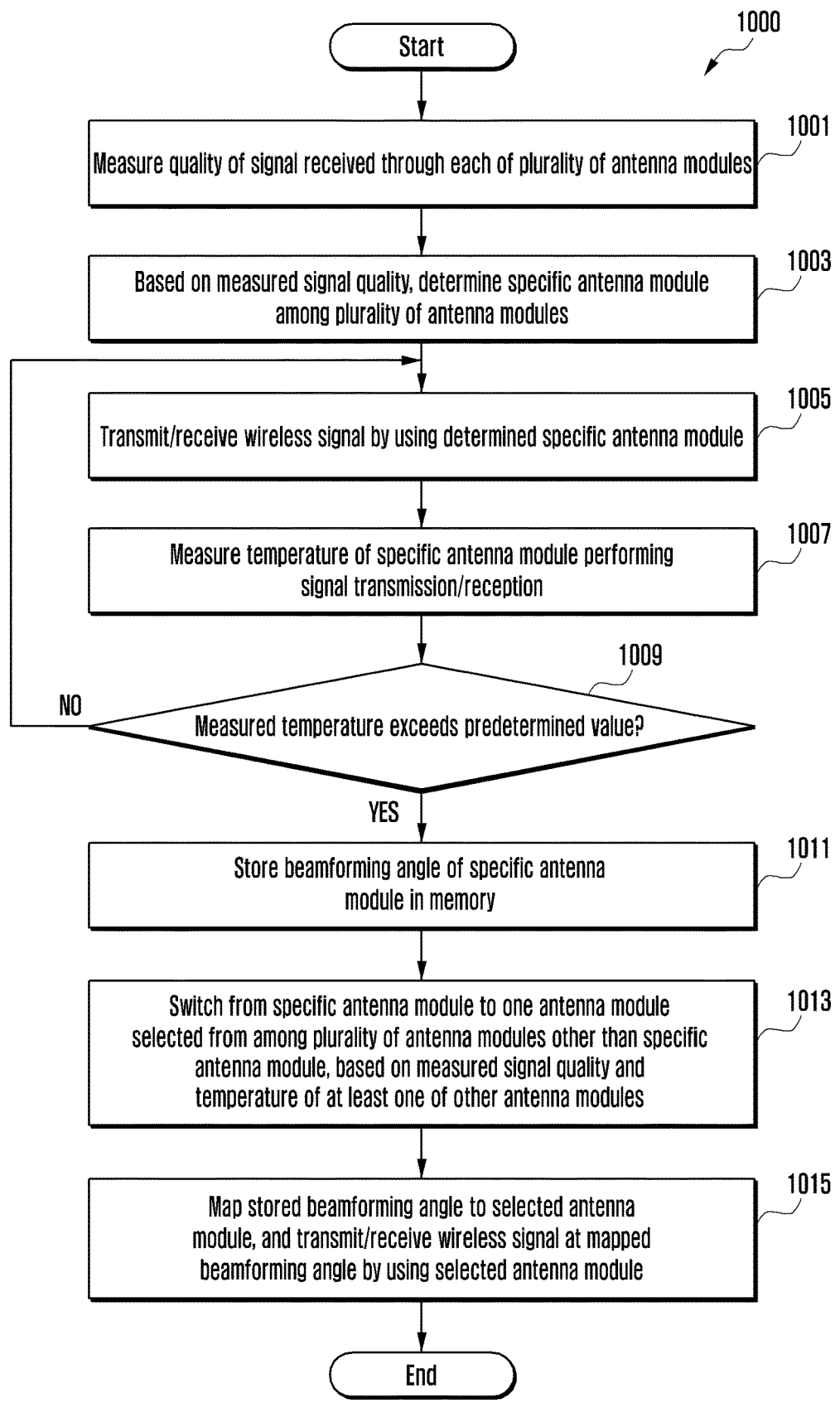
FIG. 10 is a flow diagram illustrating an antenna switching method, according to an embodiment.

FIG. 10 is a flow diagram illustrating an antenna switching method, according to an embodiment.

Steps 1001 to 1009 and 1013 of flow diagram 1000 in FIG. 10 are the same as steps 901 to 909 and 911 in FIG. 9, as described in detail above.

Referring to FIG. 10, at step 1001, a processor measures a quality (e.g., RSSI) of a signal received through each of a plurality of antenna modules. Then, based on the measured signal quality, the processor determines a specific antenna module among the plurality of antenna modules at step 1003, and transmit/receive a wireless signal at operation 1005 by using the determined specific antenna module. In addition, the processor measures, at step 1007, a temperature of the specific antenna module performing signal transmission/reception and then determines, at step 1009, whether the measured temperature exceeds a predetermined value.

When the measured temperature exceeds the predetermined value, the processor stores a beamforming angle of the specific antenna module in a memory, at step 1011.

At step 1013, the processor switches from the specific antenna module to one antenna module selected from among the plurality of antenna modules other than the specific antenna module, based on the measured signal quality and temperature of at least one of the other antenna modules.

At step 1015, the processor maps the stored beamforming angle to the selected antenna module, and transmits/receives a wireless signal at the mapped beamforming angle by using the selected antenna module.

Step 1015 is described in detail below with reference to FIG. 11.

Figure 11:
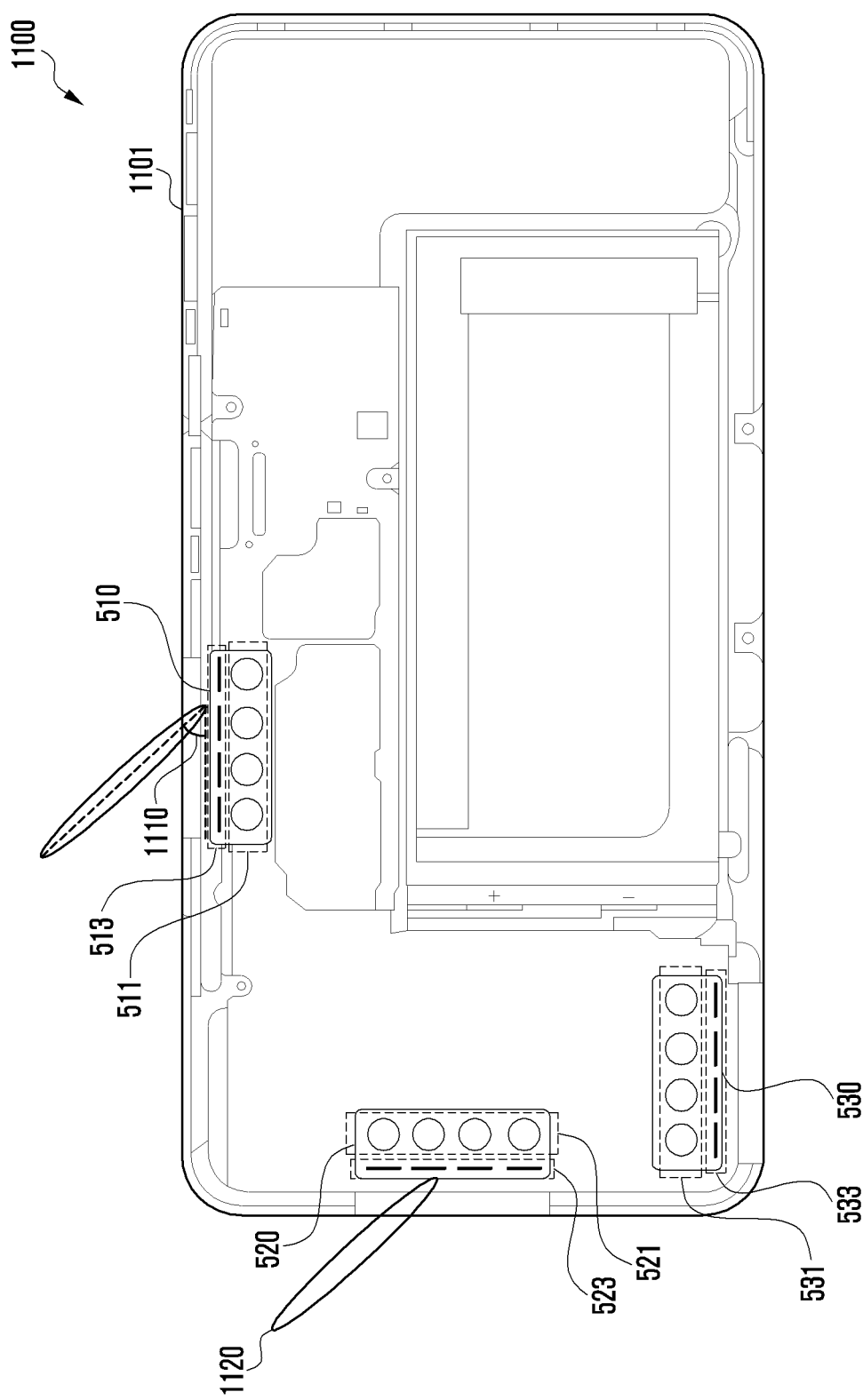
FIG. 11 is a diagram illustrating a method for applying a beamforming angle of a currently used antenna module to a newly used antenna module, according to an embodiment.

FIG. 11 is a diagram illustrating a method for applying a beamforming angle of a currently used antenna module to a newly used antenna module, according to an embodiment.

Referring to diagram 1100 of FIG. 11, among a plurality of antenna modules 510, 520, and 530, one antenna module 510 is currently used to transmit and receive a wireless signal. When a temperature of the first antenna module 510 exceeds a predetermined value, a processor 570 may store a beamforming angle 1110 of the first antenna module 510 in a memory 560.

Each of the plurality of antenna modules 510, 520, and 530 may include a plurality of antenna arrays (e.g., a dipole antenna array and/or a patch antenna array) of the same shape or type or of different shapes or types. For example, each of the plurality of antenna modules 510, 520, and 530 may include the first antenna array 511, 521, or 531 and the second antenna array 513, 523, or 533. Each of the first antenna arrays 511, 521, and 531 may form a beam pattern in a direction (e.g., the −z direction in FIG. 3B) of a rear plate 311 of an electronic device 1101 while operating as a patch antenna array. Each of the second antenna arrays 513, 523, and 533 may form a beam pattern in a direction (indicated by ①, ②, or ③) of first, second, or third lateral surface (e.g., 611, 612, or 613 in FIG. 6) while operating as a dipole antenna array.

The processor may measure a signal quality (e.g., RSSI) and temperature of each of the plurality antenna modules (e.g., the second and third antenna modules 520 and 530) other than the currently used antenna module 510, and select the second antenna module 520 or the third antenna module 530 as a newly used antenna module for switching, based on the measured signal quality and temperature.

For example, when the second antenna module 520 is selected for switching, the processor may map the stored beamforming angle 1110 of the first antenna module 510 to the second antenna module 520 such that the second antenna module 520 transmits and receives a wireless signal at the mapped beamforming angle 1120. For example, such beamforming angles 1110 and 1120 may indicate angles of beams formed by the second antenna arrays 513 and 523 operating as dipole antenna arrays and contained in the first and second antenna modules 510 and 520, respectively.

Figure 12:
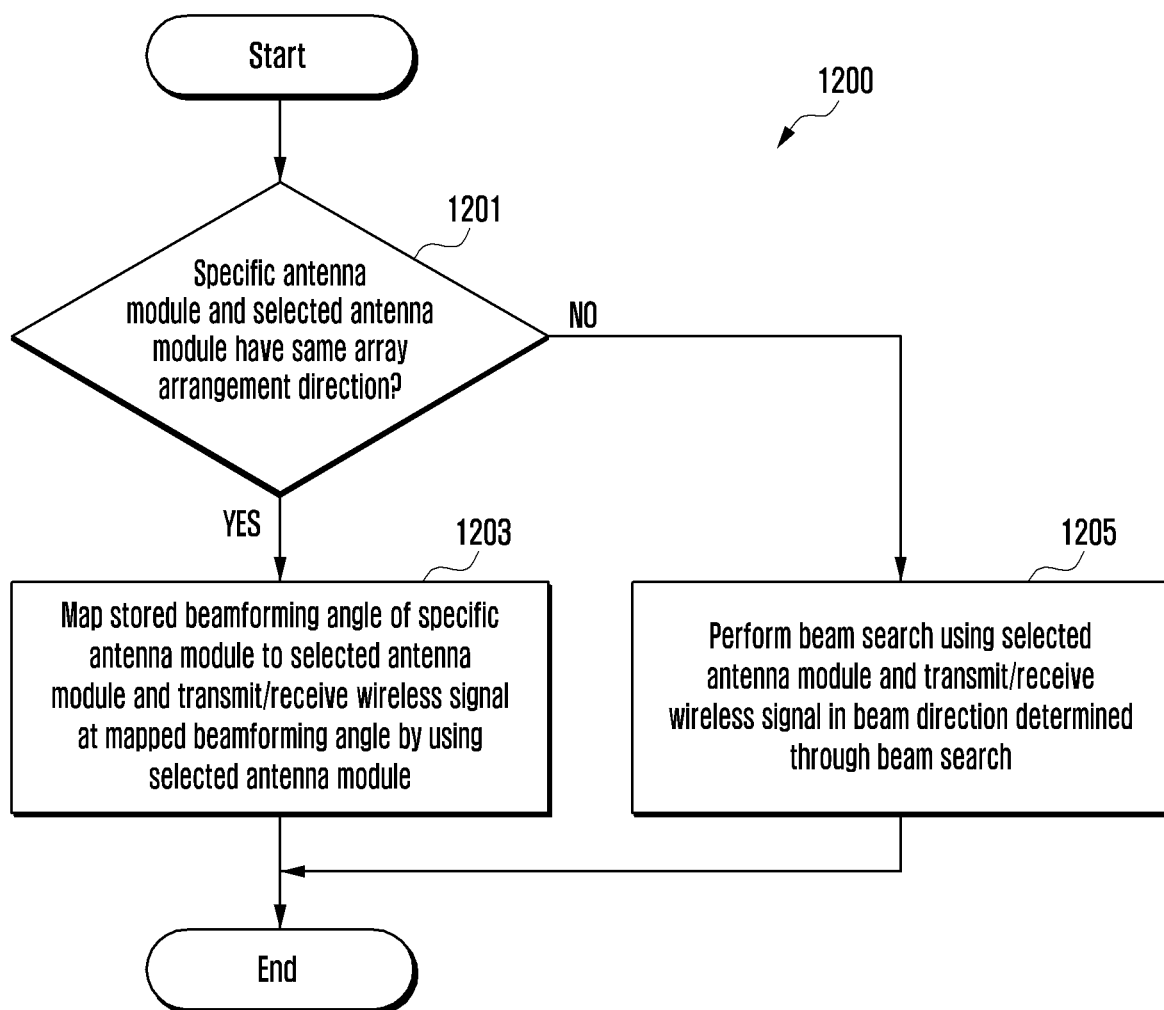
FIG. 12 is a flow diagram illustrating an antenna switching method, according to an embodiment.

FIG. 12 is a flow diagram illustrating an antenna switching method according to various embodiments.

FIG. 12 shows in detail steps 1013 and 1015 of FIG. 10. For example, FIG. 12 shows an antenna module switching operation when performing communication by using patch antenna arrays (e.g., the first antenna array 511, 521, and 531) respectively contained in antenna modules (e.g., the first, second, and third antenna modules 510, 520, and 530).

Referring to FIG. 12, among a plurality of antenna modules 510, 520, and 530, a specific antenna module is used to transmit and receive a wireless signal. When a temperature of the specific antenna module exceeds a predetermined value, a processor may switch from the specific antenna module to one antenna module selected from among the plurality of antenna modules other than the specific antenna module, based on a measured signal quality (e.g., RSSI) and temperature of at least one of the other antenna modules.

At step 1201 of flow diagram 1200, the processor determines whether the selected antenna module has the same array arrangement direction as that of the specific antenna module.

If the selected antenna module has the same array arrangement direction, at step 1203, the processor maps a beamforming angle of the specific antenna module, stored in a memory, to the selected antenna module and then transmits/receives a wireless signal at the mapped beamforming angle by using the selected antenna module.

If an array arrangement direction of the selected antenna module is different from that of the specific antenna module, at step 1205, the processor performs a beam search using the selected antenna module and then transmits/receives a wireless signal in a beam direction determined through the beam search.

As such, if the antenna modules before and after the switching operation have the same array arrangement direction, any additional beam search is not required because a beamforming angle of the previous used antenna module is mapped to the newly used antenna module. This may prevent any loss in communication due to the beam search.

Figure 13:
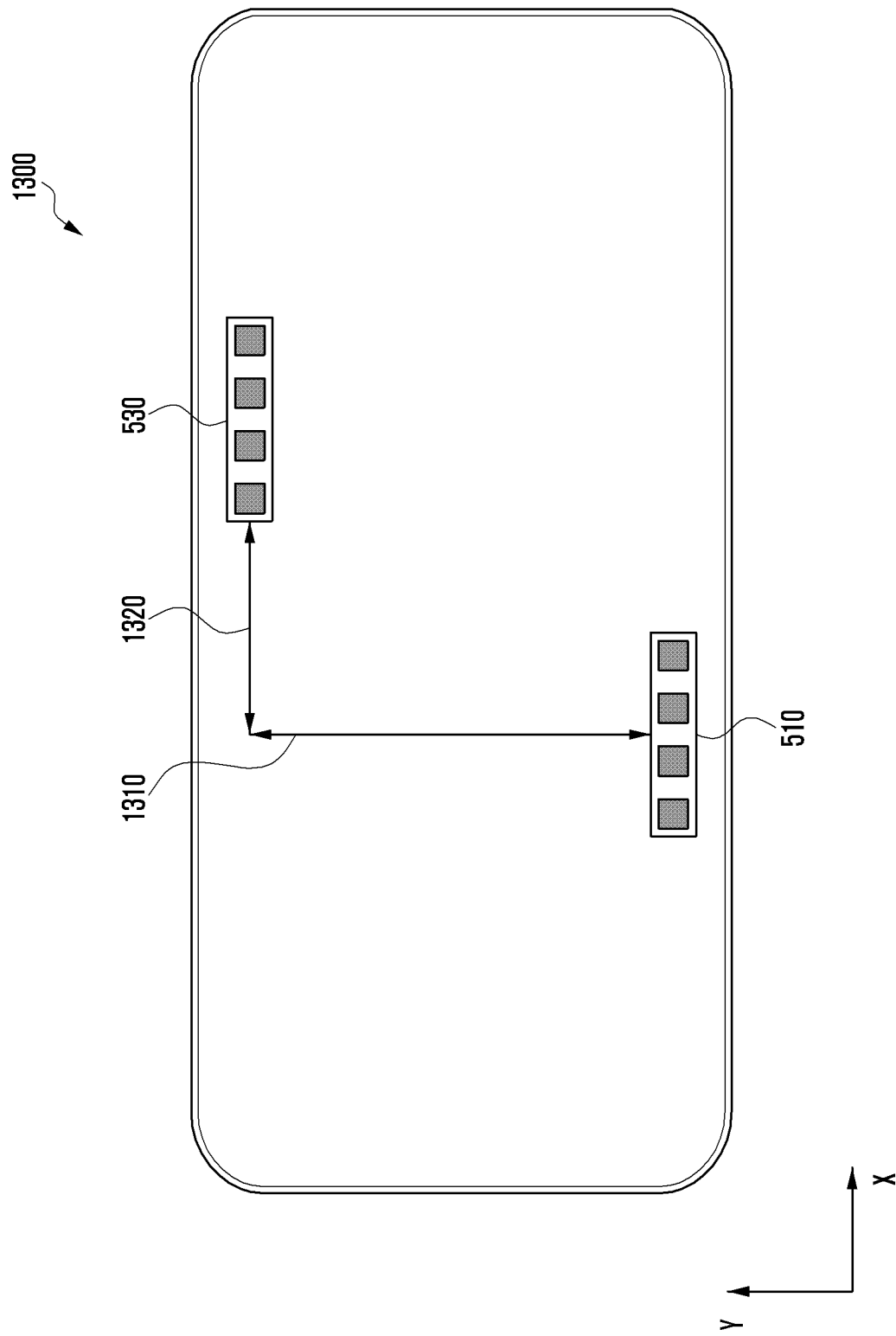
FIG. 13 is a diagram illustrating a plurality of antenna modules having the same array arrangement direction, according to an embodiment.
Figure 14:
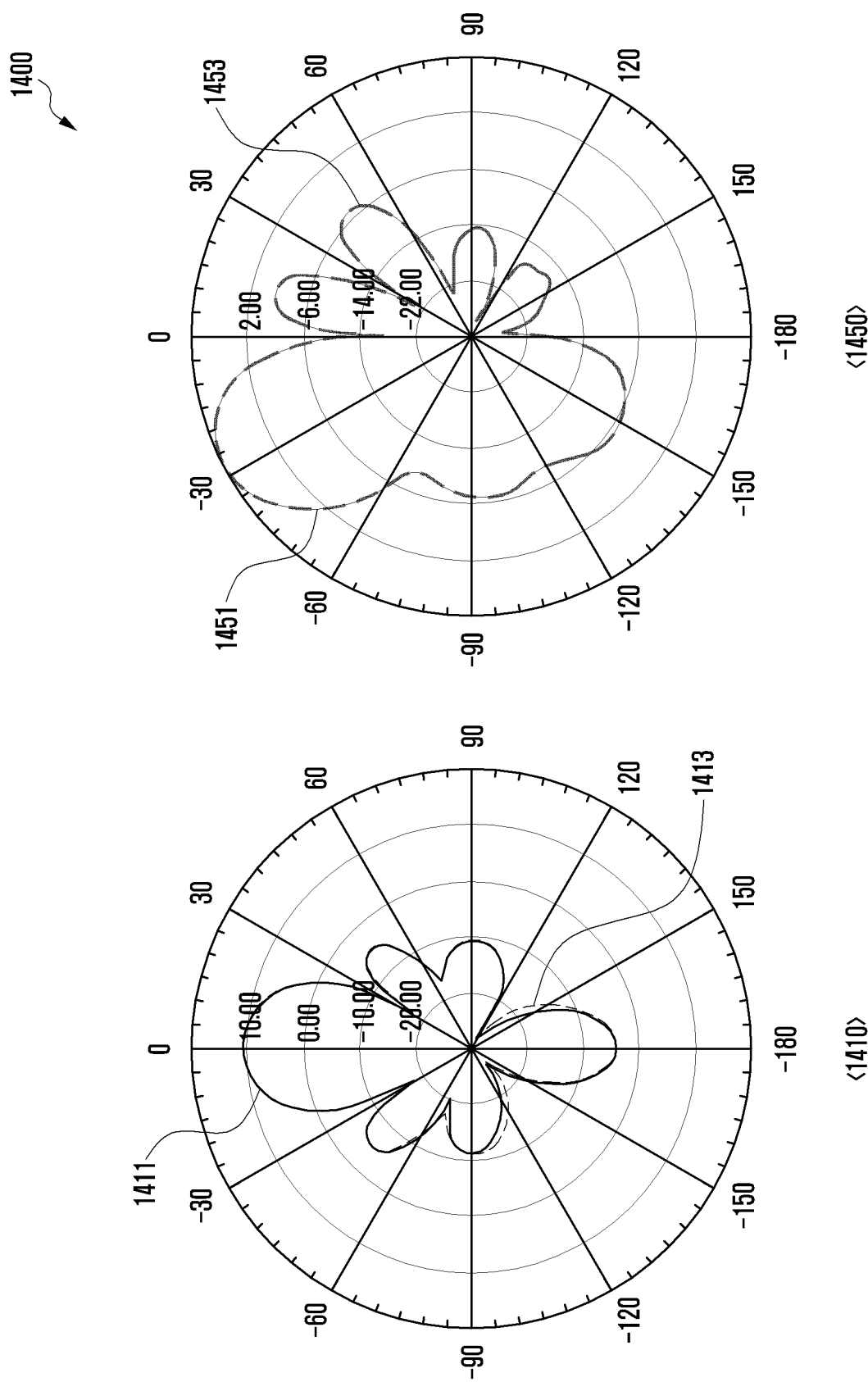
FIG. 14 is a diagram illustrating radiation patterns of a plurality of antenna modules having the same array arrangement direction, according to an embodiment.

FIG. 13 is a diagram illustrating a plurality of antenna modules having the same array arrangement direction, according to an embodiment. FIG. 14 is a diagram illustrating radiation patterns of a plurality of antenna modules having the same array arrangement direction, according to an embodiment.

Referring to diagram 1300 of FIG. 13, the first and third antenna modules 510 and 530 may be spaced apart from each other by a first distance 1320 (e.g., 3 cm) in the X-axis direction and a second distance 1310 (e.g., 7 cm) in the Y-axis direction. In addition, the first and third antenna modules 510 and 530 may have the same array arrangement direction.

It is assumed that the Y-axis direction is defined as zero degree as shown in diagram 1400 of FIG. 14. In a case 1410 where a beam is formed in a direction of zero degree, the first and third antenna modules 510 and 530 having the same array arrangement direction may form identical beam patterns 1411 and 1413.

In another case 1450 where a beam is steered to a direction of thirty degrees, the first and third antenna modules 510 and 530 having the same array arrangement direction may form identical beam patterns 1451 and 1453.

When the first antenna module 510 (or the third antenna module 530) is currently used and a temperature thereof exceeds a predetermined value, the processor may switch from the first antenna module 510 (or the third antenna module 530) to the third antenna module 530 (or the first antenna module 510) having the same array arrangement direction. In this case, because the first and third antenna modules 510 and 530 form the same beam pattern, the processor may map the beamforming angle of the first antenna module 510 to the third antenna module 530. Then, the processor may perform wireless communication using the third antenna module 530 at the mapped beamforming angle.

Figure 15:
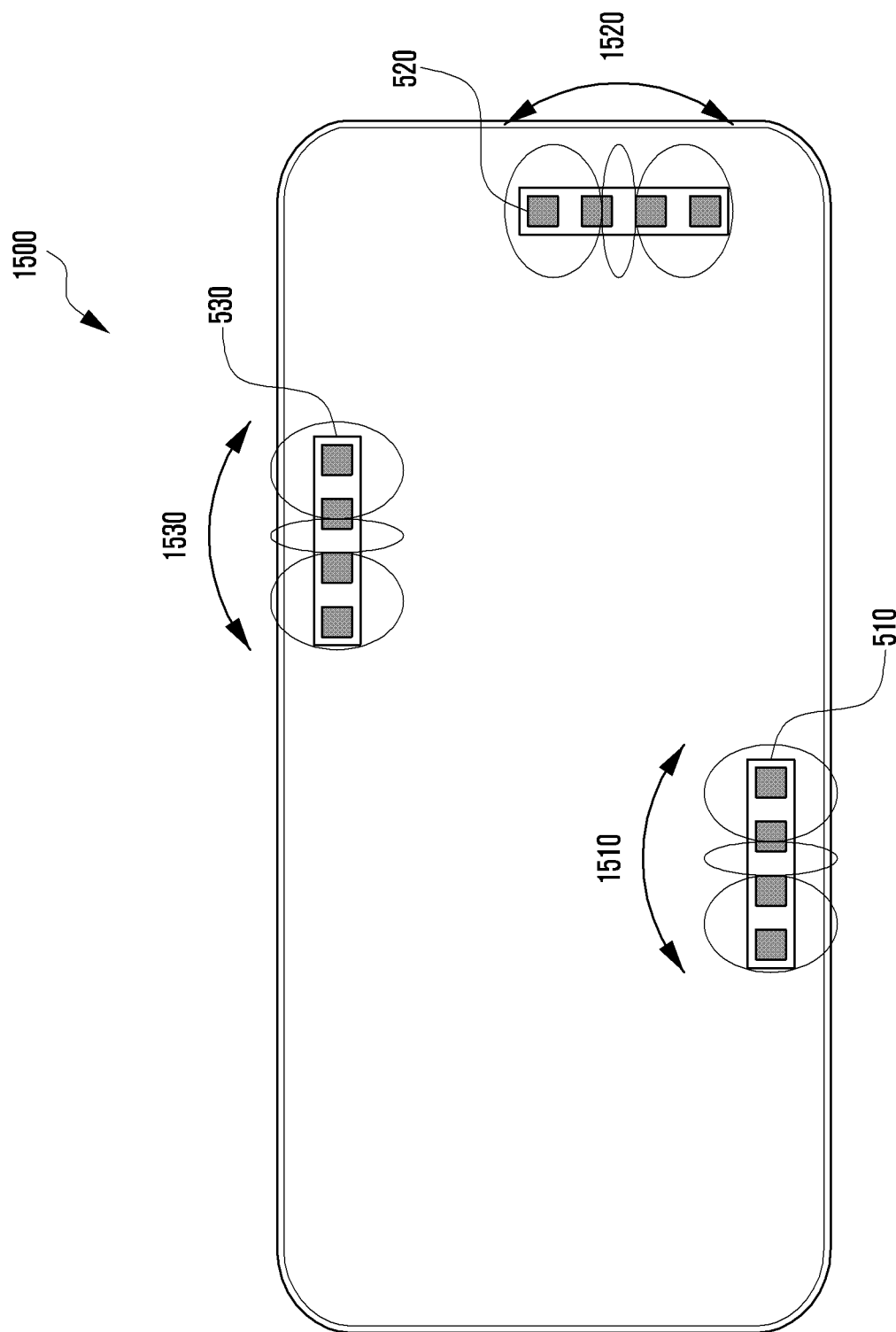
FIG. 15 is a diagram illustrating a plurality of antenna modules having different array arrangement directions, according to an embodiment.

FIG. 15 is a diagram illustrating a plurality of antenna modules having different array arrangement directions, according to an embodiment.

Referring to FIG. 15, the first and third antenna modules 510 and 530 may have the same array arrangement direction as also discussed above. In contrast, the second antenna module 520 may have an array arrangement direction different from those of the first and third antenna modules 510 and 530. Therefore, a beam sweeping direction 1520 of the second antenna module 520 may be also different from beam sweeping directions 1510 and 1530 of the first and third antenna modules 510 and 530.

In an embodiment, when an antenna module switching operation is performed from the first antenna module 510 or the third antenna module 530 to the second antenna module 520 having a different array arrangement direction, the mapping of a beamforming angle may not be performed. Instead, the processor may perform a beam search using the second antenna module 520 and then perform wireless signal transmission/reception using the second antenna module 520 in a beam direction determined through the beam search.

Meanwhile, although it has been described that an antenna module for switching is determined based on the status information (e.g., a signal quality, a temperature, or an array arrangement direction) of the antenna modules, this is exemplary only. Alternatively or additionally, the processor may control a power amplifier (PA) equipped in the antenna module so that the temperature of the antenna module does not exceed the predetermined value. Meanwhile, in an embodiment, if a signal transmission/reception rate of the 5G communication using the first frequency band is less than that of the LTE or 5G communication using the second frequency band, the processor may send, to the base station, information indicating that communication cannot be continued in the first frequency band, and then the base station may allocate suitable LTE or 5G resources of the second frequency band to the electronic device.

As described above in FIGS. 6 to 15, when the temperature of the currently used antenna module measured through the sensor module exceeds the predetermined value, the electronic device detects the status information of the remaining antenna modules and, based on the detected status information, switches from the currently used antenna module to one antenna module selected from among the remaining antenna modules. This switching operation of antenna modules can prevent the performance of the antenna module from being degraded due to heat generation.

The electronic device according to the embodiments may be one of various types of electronic devices. The electronic devices may include, for example, a portable communication device (e.g., a smartphone), a computer device, a portable multimedia device, a portable medical device, a camera, a wearable device, or a home appliance. However, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to certain embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to exemplary embodiments thereof, it will be understood by those skilled in the art that various changes in form and detail may be made therein without departing from the scope of the subject matter as defined by the appended claims.

What is claimed is:

1. A portable communication device, comprising:
a first $5^{th}$ generation (5G) antenna;
a second 5G antenna;
a legacy communication antenna;
a first communication circuit electrically connected with the first 5G antenna;
a second communication circuit electrically connected with the second 5G antenna;
a third communication circuit electrically connected with the legacy communication antenna;
a first temperature sensor disposed inside or adjacent to the first communication circuit;
a second temperature sensor disposed inside or adjacent to the second communication circuit; and
a processor operatively connected to the first communication circuit, the second communication circuit, and the third communication circuit,
wherein the processor is configured to:
control the first communication circuit to perform a wireless communication of a first frequency band via the first 5G antenna,
while the wireless communication of the first frequency band is performed using the first communication circuit, obtain first temperature information using the first temperature sensor and second temperature information using the second temperature sensor,
if the first temperature information exceeds a specified temperature and the second temperature information is less than the specified temperature, switch from the first 5G antenna to the second 5G antenna, and control the second communication circuit to perform the wireless communication in the first frequency band via the 5G second antenna, and
if the first temperature information and the second temperature information are higher than the specified temperature, control the third communication circuit to perform the wireless communication in a second frequency band via the legacy communication antenna, instead of the second communication circuit performing the wireless communication in the first frequency band via the second 5G antenna.

2. The portable communication device of claim 1, further comprising:
a first printed circuit board at which the first 5G antenna and the first communication circuit are disposed;
a second printed circuit board at which the second 5G antenna and the second communication circuit are disposed; and
a third printed circuit board at which the processor is disposed.

3. The portable communication device of claim 1, wherein the processor is further configured to, based at least in part on the first temperature information and the second temperature information, stop performing the wireless communication using the first communication circuit, while the wireless communication is performed using the second communication circuit.

4. The portable communication device of claim 1, further comprising a display,
wherein the processor is further configured to, if the first temperature information and the second temperature information are higher than the specified temperature, stop the wireless communication in the first frequency band, and control the display to display a notification indicating that a cellular network corresponding to the wireless communication in the first frequency band is not available.

5. The portable communication device of claim 4, wherein the processor is further configured to:
after stopping the wireless communication, obtain third temperature information using the first temperature sensor and fourth temperature information using the second temperature sensor, and
based at least in part on the third temperature information and the fourth temperature information, control the first communication circuit or the second communication circuit to resume performing the wireless communication in the first frequency band.

6. The portable communication device of claim 1, further comprising:
a third 5G antenna;
a fourth communication circuit electrically connected with the third 5G antenna; and
a third temperature sensor disposed inside or adjacent to the third communication circuit,
wherein the processor is further configured to:
obtain third temperature information using the third temperature sensor, and
based at least in part on the second temperature information and the third temperature information of the third 5G antenna, select, from the second communication circuit and the fourth communication circuit, the second communication circuit to be used to perform the wireless communication in the first frequency band, instead of the first communication circuit.

7. The portable communication device of claim 1, further comprising:
a third 5G antenna;
a fourth communication circuit electrically connected with the third 5G antenna; and
a third temperature sensor disposed inside or adjacent to the fourth communication circuit,
wherein the processor is further configured to:
obtain first quality information of a first signal received via the second 5G antenna using the second communication circuit, and second quality information of a second signal received via the third 5G antenna using the fourth communication circuit, and
based at least in part on the first quality information and the second quality information, select, from the second communication circuit and the third communication circuit, the second communication circuit to be used to perform the wireless communication in the first frequency hand, instead of the first communication circuit.

8. A portable communication device, comprising:
a first 5$^{th}$ generation (5G) antenna module including a first printed circuit board, a first antenna disposed at a first side of the first printed circuit board, and a first radio frequency integrated circuit (RFIC) disposed at a second side of the first printed circuit board;
a second 5G antenna module including a second printed circuit board, a second antenna disposed at a first side of the second printed circuit board, and a second RFIC disposed at a second side of the second printed circuit board;
a legacy communication antenna connected to a third RFIC;
a first temperature sensor contained within the first 5G antenna module;
a second temperature sensor contained within the second 5G antenna module; and
a processor electrically connected with the first RFIC, the second RFIC, and the third RFIC,
wherein the processor is configured to:
control the first RFIC to perform a wireless communication of a first frequency band via the first 5G antenna module,
while the wireless communication in the first frequency band is performed using the first RFIC, obtain first temperature information using the first temperature sensor and second temperature information using the second temperature sensor,
if the first temperature information exceeds a specified temperature and the second temperature information is less than the specified temperature, switch from the first 5G antenna module to the second 5G antenna module, and control the second RFIC to perform at least a portion of the wireless communication in the first frequency band via the second 5G antenna module, and
if the first temperature information and the second temperature information are higher than the specified temperature, control the third RFIC to perform the wireless communication in a second frequency band via the legacy communication antenna, instead of the second RFIC performing the wireless communication in the first frequency band via the second 5G antenna module.

9. The portable communication device of claim 8, wherein the processor is further configured to:
obtain the first temperature information using the first temperature sensor at a specified time interval, and
obtain the second temperature information using the second temperature sensor at the specified time interval.

10. The portable communication device of claim 8, wherein the processor is further configured to, based at least in part on the first temperature information, stop performing the wireless communication using the first RFIC while the wireless communication is performed using the second RFIC.

11. The portable communication device of claim 8, further comprising a display,
wherein the processor is further configured to, if the first temperature information and the second temperature information are higher than the specified temperature, stop the wireless communication in the first frequency band, and control the display to display a notification indicating that a cellular network corresponding to the wireless communication in the first frequency band is not available.

12. The portable communication device of claim 11, wherein the processor is further configured to:
after the stopping the wireless communication, obtain third temperature information using the first temperature sensor and fourth temperature information using the second temperature sensor, and based at least in part on the third temperature information and the fourth temperature information, control the first communication circuit or the second communication circuit to resume performing the wireless communication in the first frequency band.

13. The portable communication device of claim 8, further comprising:
a third 5G antenna module including a fourth printed circuit board, a third antenna disposed at the fourth printed circuit board, and a fourth RFIC disposed at the fourth printed circuit board and electrically connected with the third 5G antenna module; and
a third temperature sensor disposed at the third 5G antenna module or a proximity thereof,
wherein the processor is further configured to:
obtain third temperature information using the third temperature sensor, and
based on the second temperature information and the third temperature information, select, from the second RFIC and the third RFIC, the second RFIC to perform the wireless communication, instead of the first RFIC.

14. The portable communication device of claim 8, further comprising:
a third 5G antenna module including a fourth printed circuit board, a third antenna disposed at the fourth printed circuit board, and a fourth RFIC disposed at the fourth printed circuit board and electrically connected with the third 5G antenna module; and
a third temperature sensor disposed at the third 5G antenna module or a proximity thereof;
wherein the processor is further configured to:
obtain first quality information of a first signal received via the second antenna using the second RFIC,
obtain second quality information of a second signal received via the third antenna using the fourth RFIC, and
based on the first quality information and the second quality information, select, from the second RFIC and the fourth RFIC, the second RFIC to perform the wireless communication, instead of the first RFIC.

15. The portable communication device of claim 8, wherein the first temperature sensor is disposed inside of the first RFIC or in a first area adjacent to the first RFIC of the first printed circuit board, and
wherein the second temperature sensor is disposed inside of the second RFIC or in a second area adjacent to the second RFIC of the second printed circuit board.

16. The portable communication device of claim 8, further comprising:
a rear plate; and
a non-conductive region of a lateral surface,
wherein the first 5G antenna module comprises:
a first antenna array (AR1); and
a second antenna array (AR2),
wherein the AR1 is configured to form a first beam pattern in a direction of the rear plate, and wherein the AR2 is configured to form a second beam pattern in a direction of the non-conductive region of the lateral surface.

17. A portable communication device, comprising:
a display;
a first $5^{th}$ generation (5G) antenna;
a second 5G antenna;
a legacy communication antenna;
a first communication circuit electrically connected with the first 5G antenna;
a second communication circuit electrically connected with the second 5G antenna;
a third communication circuit electrically connected with the legacy communication antenna;
a first temperature sensor disposed inside or adjacent to the first communication circuit;
a second temperature sensor disposed inside or adjacent to the second communication circuit; and
a processor operatively connected to the first communication circuit, the second communication circuit, and the third communication circuit,
wherein the processor is configured to:
control the first communication circuit to perform a wireless communication of a first frequency band via the first 5G antenna,
while the wireless communication of the first frequency band is performed using the first communication circuit, obtain first temperature information using the first temperature sensor and second temperature information using the second temperature sensor,
if the first temperature information exceeds a specified temperature and the second temperature information is less than the specified temperature, switch from the first 5G antenna to the second 5G antenna, and control the second communication circuit to perform the wireless communication in the first frequency band via the second 5G antenna, and
if the first temperature information and the second temperature information are higher than the specified temperature, control the third communication circuit to perform the wireless communication in a second frequency band via the legacy communication antenna, instead of the first communication circuit via the first antenna, and control the display to display a notification indicating that a cellular network corresponding to the wireless communication in the first frequency band is not available.

18. The portable communication device of claim 17, wherein the processor is further configured to:
after the stopping the wireless communication, obtain third temperature information using the first temperature sensor and fourth temperature information using the second temperature sensor, and
based at least in part on the third temperature information and the fourth temperature information, control the first communication circuit or the second communication circuit to resume performing the wireless communication in the first frequency band.

* * * * *

UNITED STATES PATENT AND TRADEMARK OFFICE
CERTIFICATE OF CORRECTION

| | |
|---|---|
| PATENT NO. | : 11,736,139 B2 |
| APPLICATION NO. | : 17/412890 |
| DATED | : August 22, 2023 |
| INVENTOR(S) | : Ohhyuck Kwon et al. |

It is certified that error appears in the above-identified patent and that said Letters Patent is hereby corrected as shown below:

In the Claims

In Column 25, Line 63, in Claim 7:
"the first frequency hand, instead of the first commu-"
Should be:
-- the first frequency band, instead of the first commu- --

Signed and Sealed this
Nineteenth Day of November, 2024

Katherine Kelly Vidal
*Director of the United States Patent and Trademark Office*